United States Patent [19]

Yoshinaka et al.

[11] Patent Number: 4,678,055

[45] Date of Patent: Jul. 7, 1987

[54] FOUR-WHEEL VEHICLE DRIVE SYSTEM

[75] Inventors: Toshio Yoshinaka, Nagoya; Syuji Nagano, Toyota, both of Japan

[73] Assignee: Toyota Jidosha Kabushiki Kaisha, Aichi, Japan

[21] Appl. No.: 909,695

[22] Filed: Sep. 22, 1986

[30] Foreign Application Priority Data

Oct. 16, 1985 [JP] Japan .......................... 60-158140[U]

[51] Int. Cl.⁴ .......................... B60K 41/26; F16H 3/38
[52] U.S. Cl. ...................................... 180/247; 74/447; 180/248
[58] Field of Search ...................... 180/247, 233, 248; 74/447, 701

[56] References Cited

U.S. PATENT DOCUMENTS

| | | | |
|---|---|---|---|
| 3,529,487 | 9/1970 | Dolan | 180/247 |
| 4,467,665 | 8/1984 | Katayama et al. | 74/477 |
| 4,476,953 | 10/1984 | Hiraiwa | 180/247 |

FOREIGN PATENT DOCUMENTS

| | | |
|---|---|---|
| 53121642 | 6/1952 | Japan . |
| 57-54333 | 11/1982 | Japan . |
| 58-211056 | 12/1983 | Japan . |

Primary Examiner—John J. Love
Assistant Examiner—Donn McGiehan
Attorney, Agent, or Firm—Parkhurst & Oliff

[57] ABSTRACT

A four-wheel drive system for use in a vehicle includes mechanisms for preventing disengagement of the engagement sleeves of a transfer gear shift mechanism while permitting limited displacement of the engagement sleeves, shift forks and fork shafts to prevent a large amount of friction between grooves in the engagement sleeves and engagement fingers of the shift forks. Disengagement of the engagement sleeves is prevented by formation of chamfers and tapered surfaces on corresponding portions of the engagement sleeves, splines and sprockets. Limited displacement of the engagement sleeves, shift forks and fork shafts is accomplished by means of notches in the fork shafts which are larger than corresponding locking pins, so that the fork shafts, shift forks and engagement sleeves are displaceable within a distance corresponding to the difference in size between the notches and locking pins. The above features prevent disengagement of the engagement sleeves without undue friction and consequent sludge buildup, even when a torque is applied through the transfer gear shift mechanism and thrust forces are exerted on the engagement sleeves.

35 Claims, 20 Drawing Figures

Fig. 11
Fig. 13
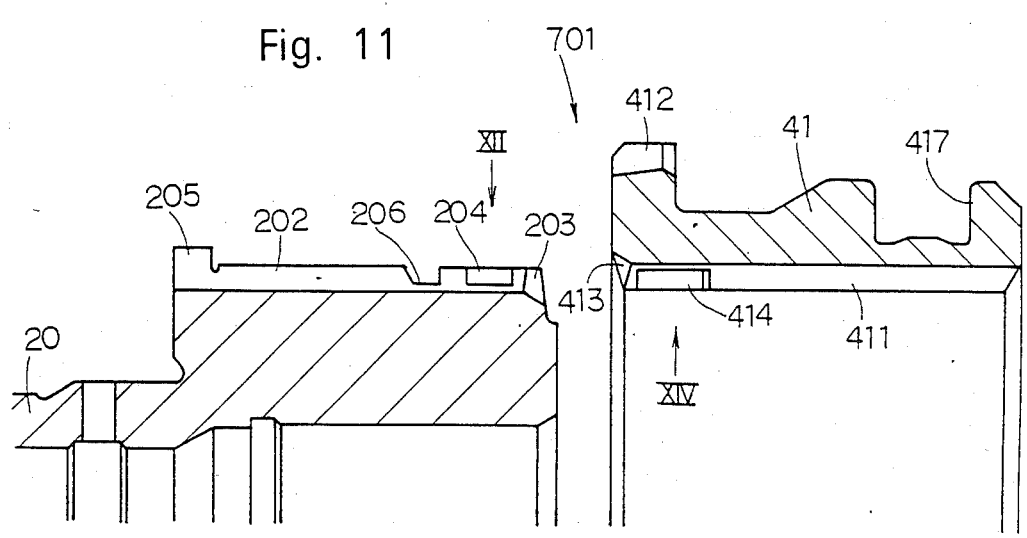
Fig. 12
Fig. 14
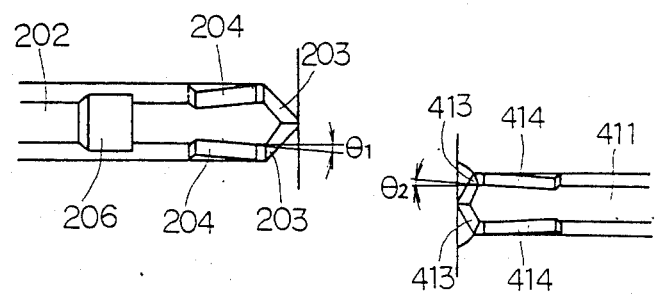

Fig. 15
Fig. 17
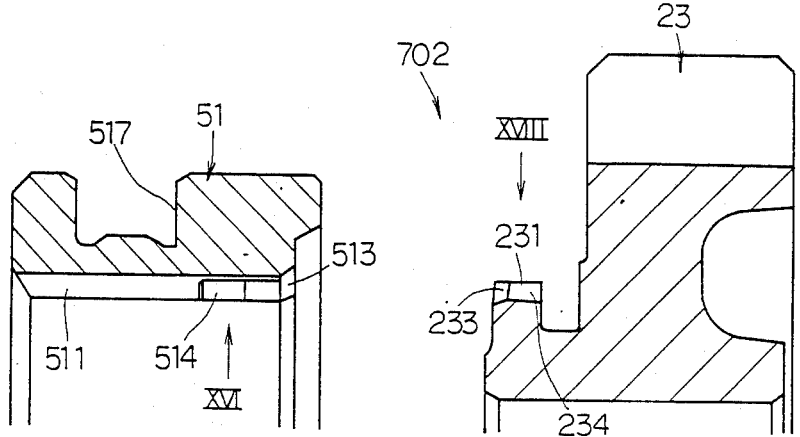
Fig. 16
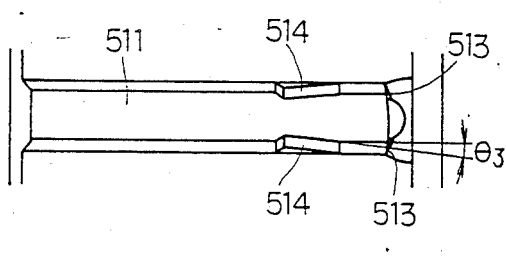
Fig. 18
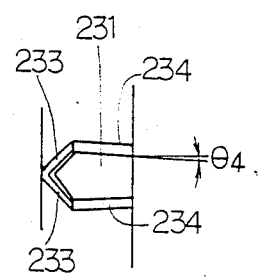

FOUR-WHEEL VEHICLE DRIVE SYSTEM

BACKGROUND OF THE INVENTION

The present invention relates to a four-wheel vehicle drive system for an automotive vehicle having at least front and rear pairs of road wheels. More particularly, the present invention relates to improvements in a transfer gear shift mechanism for shifting from a four-wheel driving condition to a two-wheel driving condition or from a high speed driving condition to a low speed driving condition.

Transfer gear shift mechanisms are disclosed in Japanese Utility Model Application Laid-Open No. Showa 53-21642 and Japanese Patent Application Laid-Open No. Showa 58-211056. These publications disclose transfer gear shift mechanisms which include a high-low speed shift mechanism, a four-two wheel drive shift mechanism, an input shaft, a first output shaft and a second output shaft. The input shaft is rotatably mounted on a transfer casing and is connected to a transmission output shaft of a transmission unit. The high-low speed drive shift mechanism is located between the input shaft and the first output shaft, and the first output shaft is connected to a rear axle shaft.

Accordingly, a vehicle may drive selectively at a high speed or a low speed by shifting the high-low speed drive shift mechanism. The first and second output shafts are rotatably mounted on the transfer casing and the four-two wheel drive shift mechanism is located between the first and second output shafts. The second output shaft is connected to a front axle shaft. Accordingly, the vehicle may drive selectively in a two wheel driving condition or a four wheel driving condition.

Therefore, the vehicle, including the above-mentioned transfer gear shift mechanism, may drive in one of a high speed two wheel driving condition, a high speed four wheel driving condition and a low speed four wheel driving condition.

As disclosed in Japanese Patent Publication No. Showa 57-54333, the high-low speed drive shift mechanism and the four-two wheel drive shift mechanism further include a plurality of engagement sleeves, a pair of fork shafts, a pair of shift forks, an operation rod and a swing arm. The engagement sleeves are slidably mounted on the first output shaft, and the engagement sleeves are selectively positioned at engagement positions or disengagement positions. When one of the engagement sleeves is positioned at the engagement position a torque on the first output shaft is transmitted to the second output shaft, and when the engagement sleeve is positioned at the disengagement position the torque is not transmitted to the second output shaft. The fork shafts are located parallel to the first and second output shafts and the fork shafts are slidably mounted on the transfer casing. Each of the shift forks is secured to a fork shaft, and each of the shift forks engages with an engagement recess of at least one engagement sleeve.

Accordingly, as the fork shaft is moved in the axial direction thereof, the shift fork forces the engagement sleeve to move selectively to the engagement position or the disengagement position. The operation rod is rotatably mounted on the transfer casing and is operated by an operator through an operation lever. The swing arm is rotatably mounted on an end of the operation rod and engages with both fork shafts. When the operation rod rotates, the swing arm forces the fork shafts to move in the axial direction of the fork shafts.

The high-low speed drive shift mechanism and the four-two wheel drive shift mechanism include respective regulators for regulating movements of the fork shafts. Each of the regulators includes a plurality of notches defined on the fork shaft, a locking ball which engages with one of the plurality of notches and which is biased by a spring, and an interlock pin which engages selectively with one of the plurality of notches and which prevents one of the fork shafts from moving with another of the fork shafts.

However, these apparatuses do not have means for preventing disengagement of the engagement sleeves of the high-low speed drive shift mechanism and the two-four wheel drive shift mechanism during rotation of the first output shafts, or means for preventing undue friction between shift fork engagement fingers and engagement sleeve grooves resulting from disengagement prevention.

SUMMARY OF THE INVENTION

The present invention was developed in view of the foregoing background and to overcome the foregoing drawbacks. It is accordingly an object of this invention to provide a four-wheel vehicle drive system, including a high-low speed drive shift mechanism and a four-two wheel drive shift mechanism, which can provide certainty and eliablity in engagement conditions of the high-low speed drive shift mechanism and the four-two wheel drive shift mechanism.

To attain certainty and reliability in the engagement conditions of the high-low speed drive shift mechanism and the four-two wheel drive shift mechanism, a four-wheel drive system for use in a vehicle includes first and second pairs of road wheels, an engine including an output shaft, and transmission including input and output shafts. The input shaft of the transmission is selectively connected to the output shaft of the engine, and the output shaft of the transmission is selectively in driving engagement with the input shaft of the transmission. Further, the four-wheel drive system comprises a first spline member, a second spline member, an engagement sleeve member, a shaft member, a locking member and a fork member.

The first spline member is rotatable about a first rotational axis and is driven by the output shaft of the transmission. The first spline member has a first engagement means and a first part of a disengagment preventing means.

The second spline member is rotatable about the first rotational axis of the first spline member and is located next to the first spline member.

The engagement sleeve member is slidably mounted on the second spline member and the engagement sleeve member has a third engagement means and a second part of the disengagement preventing means. The second engagement means of the engagement sleeve member selectively engages with the first engagement means of the first spline member, and the second part of the disengagement preventing means of the engagement sleeve member selectively engages with the first part of the disengagement preventing means of the first spline member. The engagement sleeve member is selectively positioned at one of a first spline engagement position and a first spline disengagement position.

The shaft member is located parallel to the first rotational axis of the first spline member and is selectively positioned at one of a first position and a second position. The first position of the shaft member corresponds to the first spline engagement position of the engagement sleeve member, and the second position of the shaft member corresponds to the first spline disengagement position of the engagement sleeve member. The shaft member has a first notch and a second notch, a width of the first notch being larger than a width of the second notch.

The locking member is biased toward the shaft member and is selectively inserted in one of the first and second notches of the shaft member, so that when the shaft member is positioned at the first position the locking member is inserted in the first notch of the shaft member and a space is defined in the longitudinal direction of the shaft member between a side of the locking member and a corresponding side of the first notch, and when the shaft member is positioned at the second position the locking member is inserted in the second notch of the shaft member and two sides of the locking member are in contact with corresponding sides of the second notch.

The fork member is secured to the shaft member, and the fork member has an engagement finger. The engagement finger engages with the engagement sleeve member, and the fork member is selectively positioned according to one of the first and second positions of the shaft member, whereby when the shaft member is positioned at the first position the locking member is inserted in the first notch of the shaft member with the space, the engagement sleeve member is positioned at the first spline engagement position and the first part of the disengagement preventing means of the first spline member engages with the second part of the disengagement preventing means of the engagement sleeve member, so that even when a torque is applied to the first spline member and a thrust force is exerted on the engagement sleeve member, the engagement sleeve member, the fork member and the shaft member are displaced within the space defined between the locking member and the first notch of the shaft member without a large amount of friction and without disengagement of the engagement sleeve member.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements:

FIG. 11 is a further enlarged cross-sectional view of an input shaft which engages with the first engagement sleeve;

FIG. 12 is a top plan view of the input shaft shown in FIG. 11, as viewed from XII in FIG. 11;

FIG. 13 is a further enlarged cross-sectional view of the first engagement sleeve which engages with the input shaft shown in FIG. 11;

FIG. 14 is an internal plan view of the first engagement sleeve shown in FIG. 13, as viewed from XIV in FIG. 13;

FIG. 15 is a further enlarged cross-sectional view of the second engagement sleeve which engages with a drive sprocket wheel;

FIG. 16 is an internal plan view of the second engagement sleeve shown in FIG. 15, as viewed from XVI in FIG. 15;

FIG. 17 is a further enlarged cross-sectional view of the drive sprocket wheel which engages with the second engagement sleeve shown in FIG. 15;

FIG. 18 is a top plan view of the drive sprocket wheel shown in FIG. 17, as viewed from XVIII in FIG. 17;

DETAILED DESCRIPTION OF THE PREFERRED EMBODIMENTS

The present invention will be described in detail with reference to the accompanying drawings which illustrate different embodiments according to the present invention.

Figure 1:
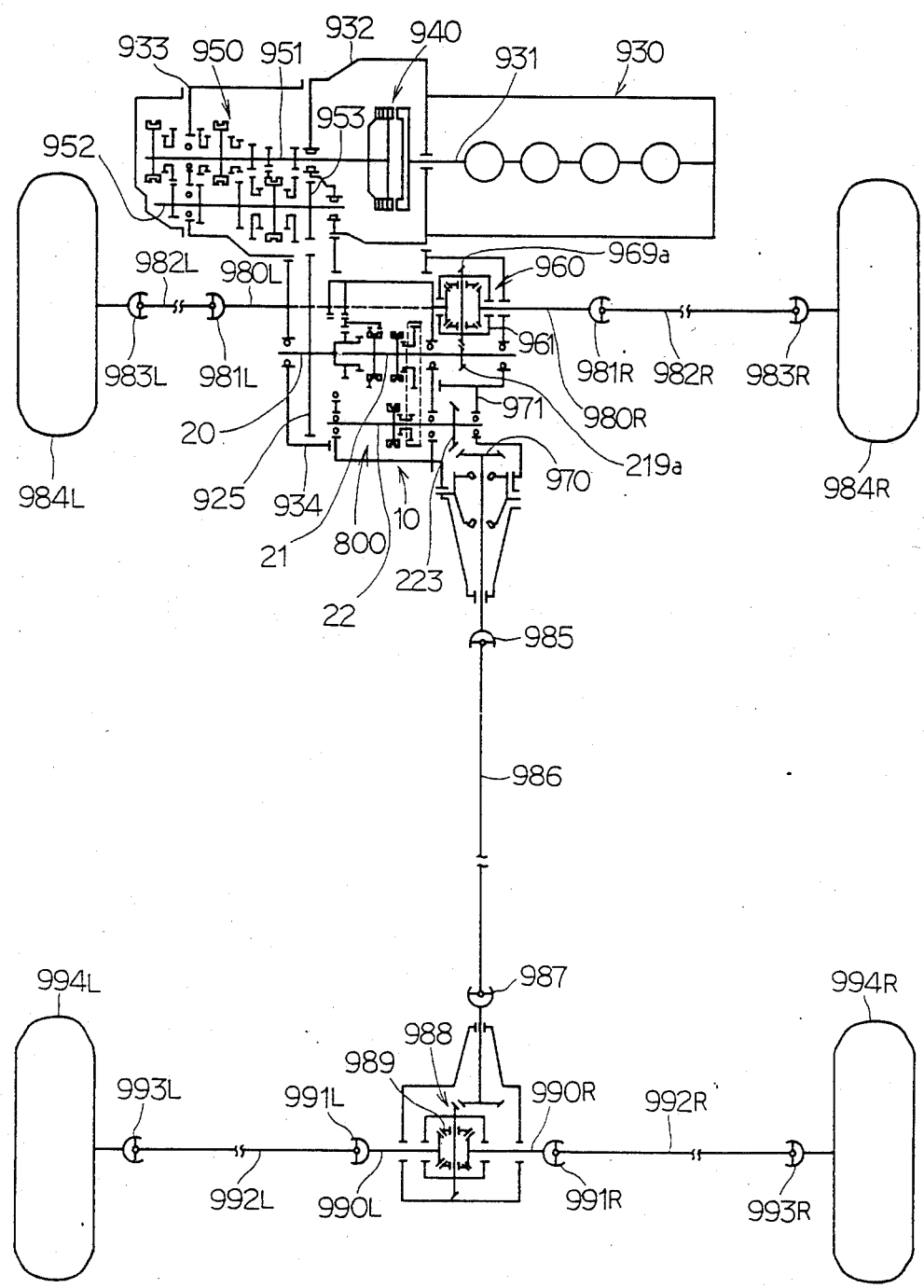
FIG. 1 is a schematic plan view showing a preferred embodiment of a four-wheel drive system according to the present invention.

Referring to FIG. 1, an engine 930 is located on a front portion of a vehicle and a crank shaft 931 of the engine 930 is parallel to the lateral direction of the vehicle. A transmission unit 950 is located on the front portion of the vehicle and an input shaft 951 of the transmission unit 950 is located on an extended portion of a rotational center axis of the crank shaft 931. The input shaft 951 is located within a transmission casing 933, and a clutch housing 932 is located between the transmission casing 933 and the engine 930. A clutch 940 is located within the clutch housing 932, and the clutch 940 has a center axis which is located on the extended portion of the rotational center axes of the crank shaft 931 and the input shaft 951. An output shaft 952 of the transmission unit 950 is located within the transmission casing 933, and the output shaft 952 is parallel to the input shaft 951. The input shaft 951 and the output shaft 952 are rotatably mounted on the transmission casing 933. An output gear 953 is secured to the output shaft 952, and the output gear 953 engages with a final reduction gear 925 which is secured to a first input shaft 20 of a transfer gear shift mechanism 800.

Figure 4:
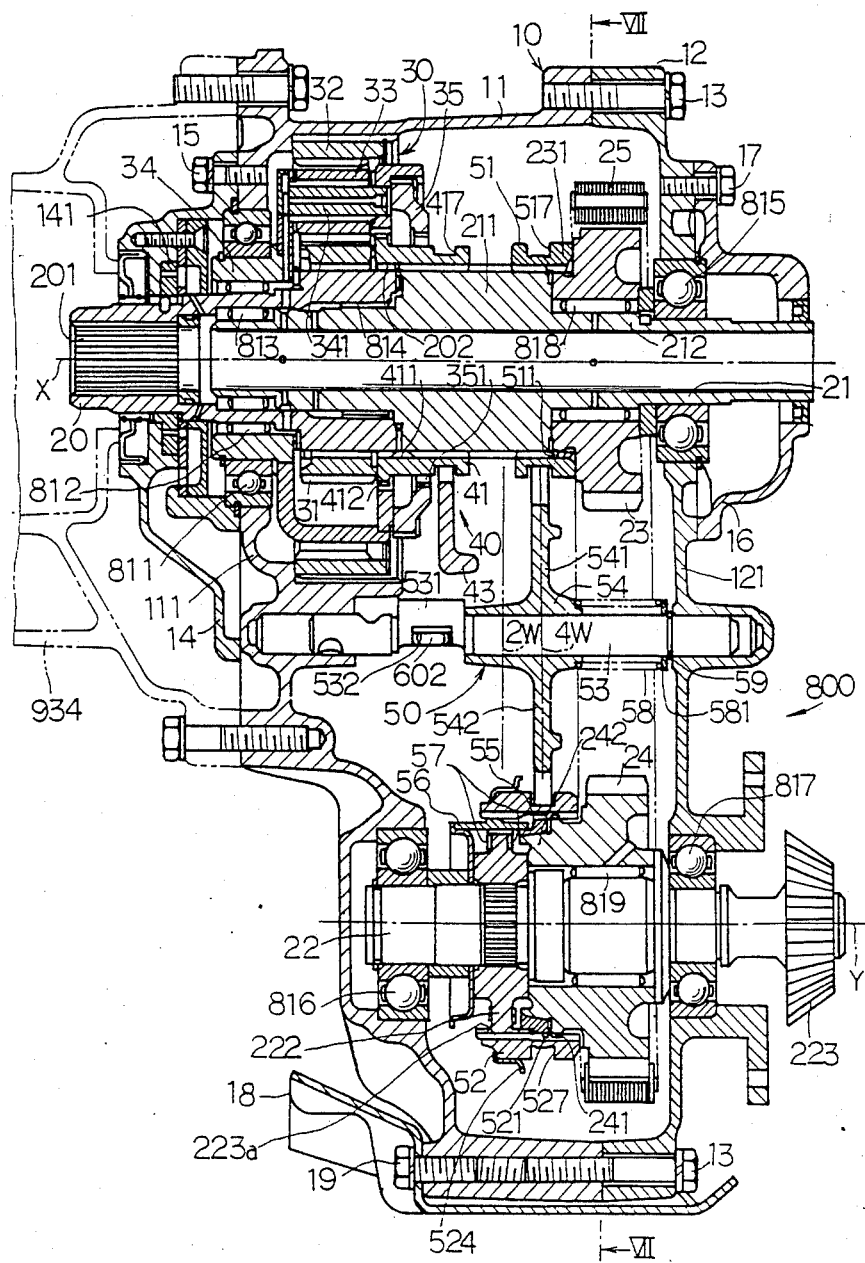
FIG. 4 is an enlarged cross-sectional view of the transfer casing taken along the line IV—IV in FIG. 2.

As shown in FIG. 4, the transfer gear shift mechanism 800 includes the first input shaft 20, a second input shaft 21, an output shaft 22, a driving sprocket wheel 23, a chain 25, an epicycle reduction gear unit 30, a high-low speed shift mechanism 40 and a two-four wheel drive shift mechanism 50.

Further, as shown in FIG. 1, a first bevel gear 219a is secured to the second input shaft 21 and the first bevel gear 219a engages with a peripheral gear 969a which is secured to a front wheel differential gear assembly 960.

The front wheel differential gear assembly 960 has a rotational center axis which coincides with rotational center axes of front axles 980L and 980R. An inner end of the left front axle 980L is connected to a front first side gear of the front wheel differential gear assembly 960 and an outer end of the left front axle 980L is connected to a first constant velocity or universal coupling unit 981L. An inner end of a left output axle 982L is connected to the first constant velocity coupling unit 981L and an outer end of the left output axle 982L is connected to a left front wheel 984L through a second constant velocity coupling unit 983L.

In a similar manner, the right front axle 980R is connected to a front second side gear of the front wheel differential gear assembly 960 and a first constant velocity coupling unit 981R. An inner end of a right output axle 982R is connected to the first constant velocity coupling unit 981R and an outer end of the right output axle 982R is connected to a right front wheel 984R through a second constant velocity coupling unit 983R.

The front wheel differential gear assembly 960 is located within a second adapter casing 971 and the second adapter casing 971 is secured to the right side of a transfer casing 10. The transfer gear shift mechanism 800 is located within the transfer casing 10 which is shown in detail in FIGS. 2 and 4. A first adapter casing 934 is secured to the left side of the transfer casing 10. A right-angle power transfer gear mechanism 970 is covered with the second adapter casing 971, and the right-angle power transfer gear mechanism 970 engages with a second bevel gear 223 of the transfer gear shift mechanism 800. The right angle power transfer gear mechanism 970 is connected to a first universal coupling unit 985. A front end of a propeller shaft 986 is connected to the first universal coupling unit 985 and a rear end of the propeller shaft 986 is connected to a rear final reduction gear 988 through a second universal coupling unit 987.

The propeller shaft 986 is located in the vicinity of the central longitudinal line of the vehicle.

The rear final reduction gear 988 engages with a rear wheel differential gear assembly 989, and the rear wheel differential gear assembly 989 includes a pair of side bevel gears.

A right end of a left rear shaft 990L is connected to one of the side bevel gears of the rear wheel differential gear assembly 989, and a left end of the left rear shaft 990L is connected to a first rear constant velocity coupling unit 991L. A right end of a left rear output axle 992L is connected to the first rear constant velocity coupling unit 991L, and a left end of the left rear output axle 992L is connected to a left rear wheel 994L through a second rear constant velocity coupling unit 993L.

In a similar manner, a right rear shaft 990R is connected to another one of the side bevel gears of the rear wheel differential gear assembly 989 and to a first rear constant velocity coupling unit 991R. A right rear output axle 992R is connected to the first rear constant velocity coupling unit 991R and to the right rear wheel 994R through a second rear constant velocity coupling unit 993R.

In the vertical direction of the vehicle, the crank shaft 931 of the engine 930 and the input shaft 951 of the transmission unit 950 are located at a first vertical level which is higher than a second vertical level at which the output shaft 952 of the transmission unit 950 is located.

The first and second input shafts 20 and 21 of the transfer gear shift mechanism 800 are located at a third vertical level which is lower than the second vertical level of the output shaft 952 of the transmission unit 950.

The left and right front axles 980L and 980R and a driven gear shaft of the right-angle power transfer gear mechanism 970 are located at a fourth vertical level which is lower than the third vertical level of the first and second input shafts 20 and 21.

Figure 3:
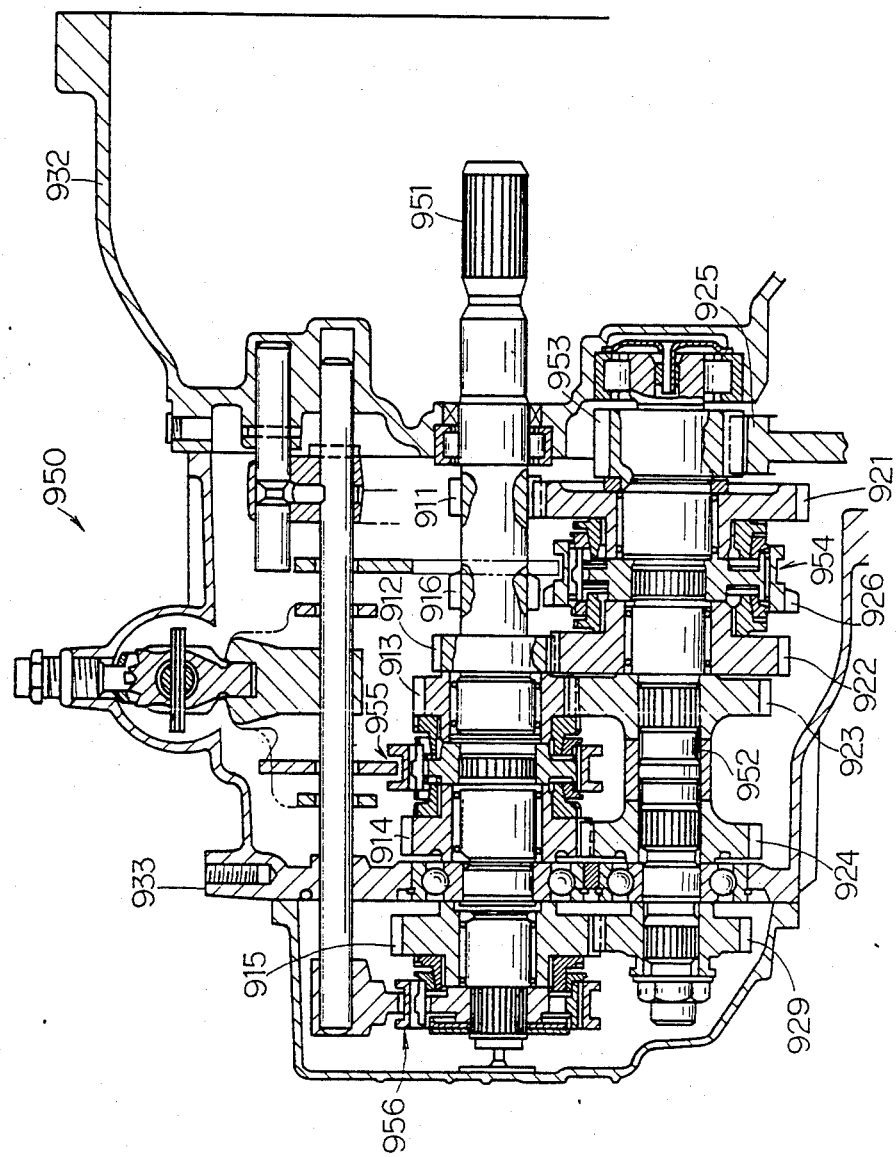
FIG. 3 is an enlarged cross-sectional view of a transmission of the four-wheel drive system shown in FIG. 1.

As shown in FIG. 3, the transmission unit 950 includes the input shaft 951 and the output shaft 952. The input shaft 951 and the output shaft 952 are respectively mounted rotatably on a first portion of the transmission casing 933 through bearings. An edge of the first portion of the transmission casing 933 is secured to the clutch housing 932, and an opposite edge of the first portion is secured to a second portion of the transmission casing 933. The input shaft 951 and the output shaft 952 are also respectively mounted rotatably on the clutch housing 932 through bearings.

A first driving gear 911, a second driving gear 912 and a reverse driving gear 916 are integrally secured to the input shaft 951, and a third driving gear 913, a fourth driving gear 914 and a fifth driving gear 915 are rotatably mounted on the input shaft 951. The reverse driving gear 916 is located between the first driving gear 911 and the second driving gear 912. The fourth driving gear 914 is located between the third driving gear 913 and the fifth driving gear 915. The third driving gear 913 is located at an outer side of the second driving gear 912. A first driven gear 921 and a second driven gear 922 are rotatably mounted on the output shaft 952, and a third driven gear 923, a fourth driven gear 924 and a fifth driven gear 929 are integrally secured to the output shaft 952. The first driving gear 911 engages with the first driven gear 921, and the second driving gear 912 engages with the second driven gear 922. The third driving gear 913 engages with the third driven gear 923, and the fourth driving gear 914 engages with the fourth driven gear 924. The fifth driving gear 915 engages with the fifth driven gear 929, and the reverse driving gear 916 engages with the reverse driven gear 926.

A first synchronizer clutch assembly 954 is mounted between the first driven gear 921 and the second driven gear 922 on the output shaft 952, and a reverse driven gear 926 is integrally secured to a sleeve of the first synchronizer clutch assembly 954. A second synchronizer clutch assembly 955 is mounted between the third driving gear 913 and the fourth driving gear 914 on the input shaft 951, and a third synchronizer clutch assembly 956 is mounted on an end of the input shaft 951 and at an outer side of the fifth driving gear 915. The output gear 953 is mounted in the vicinity of an inner end of the output shaft 952 and on an inner side of the first driven gear 921. The output gear 953 engages with the final reduction gear 925, and the final reduction bear 925 is secured to a differential gear housing 961 of the front wheel differential gear assembly 960 by a bolt. The front wheel differential gear housing 961 includes a first portion and a second portion. As shown in FIG. 1, the front wheel differential gear housing 961 is rotatably mounted on the first adapter casing 934 through bearings, and the front wheel differential gear assembly 960 has a rotational center axis "X" which coincides with the rotational axes of the front axles 980L and 980R.

As shown in FIG. 4, the transfer casing 10 includes a left casing 11 and a right casing 12 which is secured to the left casing 11 by a plurality of bolts 13. A pump body 14 is secured to a left wall 111 of the left casing 11 by a plurality of bolts 15, and an extension housing 16 is secured to a right wall 121 of the right casing 12 by a bolt 17. The first adapter casing 934 is secured to the left wall 111 of the left casing 11, and the first adapter casing 934 is located between the transfer casing 10 and the transmission casing 933. A protector plate 18 is secured to a bottom of the transfer casing 10 by a pair of bolts 19, so that the protector plate 18 prevents the transfer casing 10 from being damaged by projecting obstacles on the ground. The bolt 19 is inserted from the opposite direction in the same bolt hole as the bolt 13.

Figure 2:
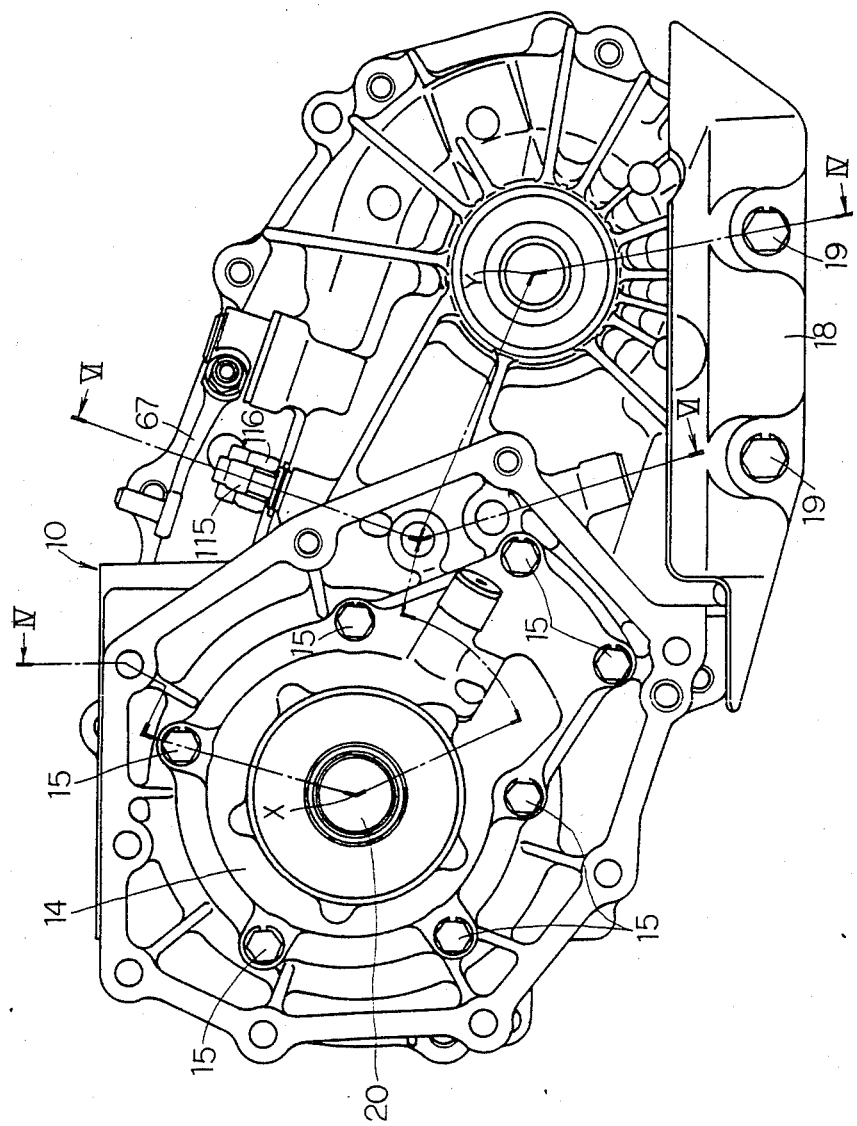
FIG. 2 is an enlarged front elevation view of a transfer casing of the four-wheel drive system shown in FIG. 1.

In FIG. 2, "X" represents the central axis of the first input shaft 20 and the second input shaft 21, and "Y" represents a central axis of the output shaft 22. The central axis "Y" is located lower than the central axis "X" in the vertical direction of the vehicle.

In FIG. 4, the first input shaft 20 is rotatably mounted on an inner surface of a planet carrier 34 of the epicycle reduction gear unit 30 by bearings 812, and the planet carrier 34 is rotatably mounted on the left wall 111 of the transfer casing 10 by bearings 811. The first input shaft 20 includes an inner spline 201 on a left side inner surface thereof, and the inner spline 201 engages with an outer spline of the front wheel differential gear housing 961. Accordingly, the rotation of the final reduction gear 925 is transmitted to the planet carrier 34 of the epicycle reduction gear unit 30.

Further, the first input shaft 20 includes an outer spline 202 on a right side outer surface thereof, and an oil pump 141 is secured to a left side outer surface of the first input shaft 20. The oil pump 141 is located within the pump body 14.

Figure 5:
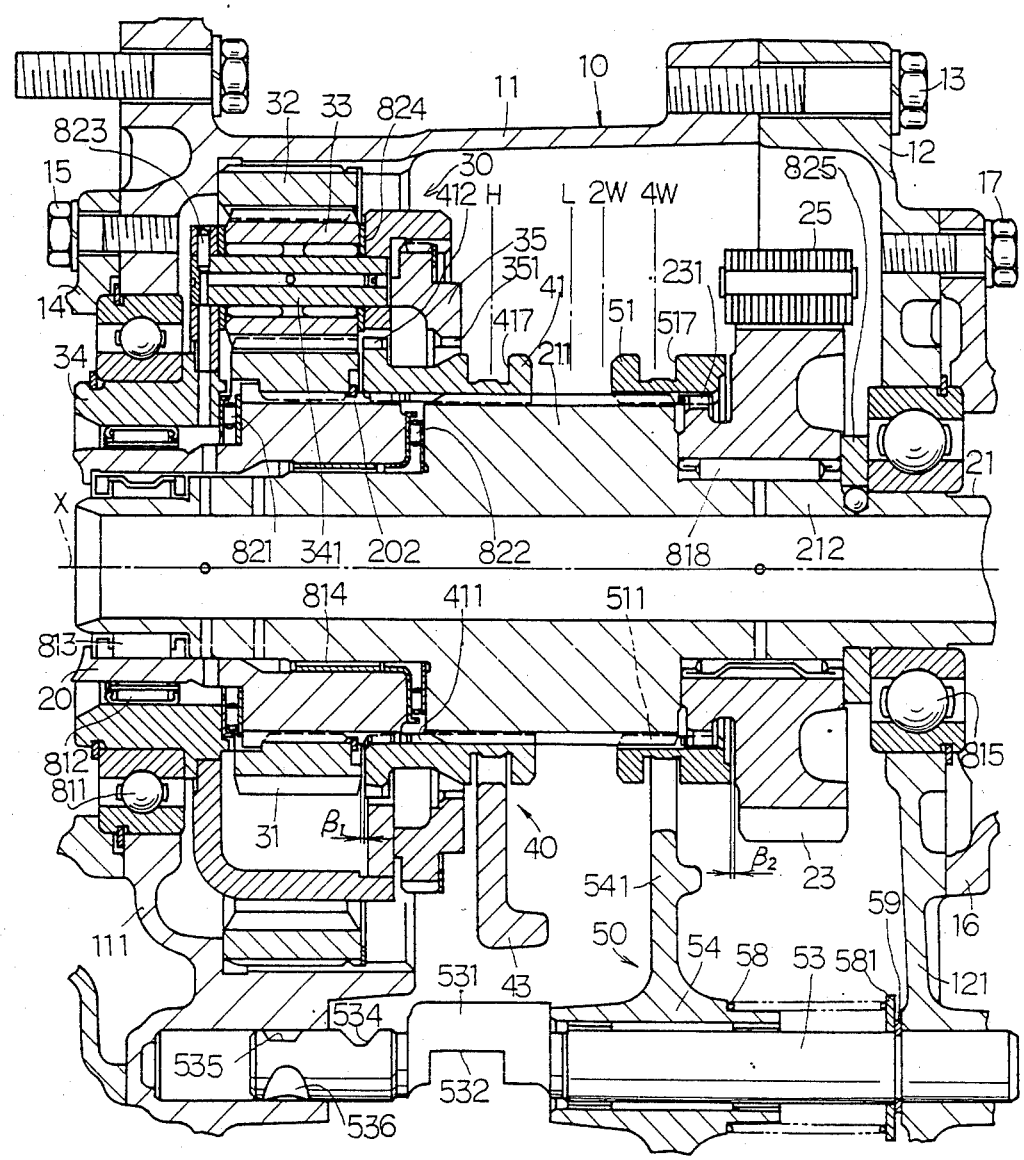
FIG. 5 is a further enlarged cross-sectional view of components of a high-low speed drive shift mechanism and a two-four wheel drive shift mechanism shown in FIG. 4, wherein a first engagement sleeve of the high-low speed drive shift mechanism is positioned in a high speed drive condition and a second engagement sleeve of the two-four wheel drive shift mechanism is positioned in a four-wheel drive condition.

The second input shaft 21 is coaxial with the first input shaft 20, and the second input shaft 21 has a hollow portion therewithin. As shown in FIG. 5, a left portion of the second input shaft 21 is rotatably mounted on a right side inner surface of the first input shaft 20 by bearings 813 and 814, and a right portion of the second input shaft 21 is rotatably mounted on the right wall 121 of the transfer casing 10 by a bearing 815. The second input shaft 21 includes an intermediate spline hub 211, which has a large diameter, and a small diameter portion 212 which is located at a right side of the intermediate spline hub 211.

In FIG. 4, the output shaft 22 is rotatably mounted on the left and right walls 111 and 121 by bearings 816 and 817, and the output shaft 22 is located parallel to the first and second input shafts 20 and 21. The bevel driving gear 223 is secured to a right end of the output shaft 22, and the bevel driving gear 223 engages with a bevel driven gear of the right-angle power transfer gear mechanism 970.

The driving sprocket wheel 23 is rotatably mounted on the small diameter portion 212 of the second input shaft 21 by a bearing 818, and the driving sprocket wheel 23 is located between the intermediate spline hub 211 of the second output shaft 21 and the bearing 815. A driven sprocket wheel 24 is rotatably mounted on the output shaft 22 by a bearing 819, and the driven sprocket wheel 24 engages with the chain 25 so that the rotation of the driving sprocket wheel 23 is transmitted to the driven sprocket wheel 24 by the chain 25.

The epicycle reduction gear unit 30 is an element of a high-low speed shift mechanism 40, which includes a sun gear 31, an annulus 32, a plurality of planet gears 33 and the planet carrier 34. The sun gear 31 engages with the outer spline 202 of the first input shaft 20, and the sun gear 31 is securely mounted on the first input shaft 20 so that the sun gear 31 cannot slide on the first input shaft 20 in the axial direction of the first input shaft 20. The annulus 32 is secured to an inner surface of the left casing 11 of the transfer casing 10, and the annulus 32 is coaxial with the sun gear 31. The plurality of planet gears 33 engage with both the sun gear 31 and the annulus 32, and the plurality of planet gears 33 are rotatably mounted on the planet carrier 34. The planet carrier 34 is rotatably mounted on the first input shaft 20, and the axial movement of the planet carrier 34 is limited. Accordingly, each planet gear 33 rotates both about one of a plurality of shafts 341 of the planet carrier 34 and about the central axis "X" of the planet carrier 34. The axial movement of each planet gear 33 is limited.

A gear plate 35 is secured to a right side of the planet carrier 34, and the gear plate 35 rotates with the planet carrier 34 about the central axis "X". The gear plate 35 includes an inner spline 351 which selectively engages with an outer spline 412 of a first engagement sleeve 41 of the high-low speed shift mechanism 40. When the first engagement sleeve 41 is moved to the right in FIG. 5, the outer spline 412 engages with the inner spline 351 of the gear plate 35. As a result, the rotation of the first input shaft 20 is reduced by the epicycle reduction gear unit 34, and then the reduced rotation is transmitted to the second input shaft 21 through the gear plate 35 and the first engagement sleeve 41.

The high-low speed shift mechanism 40 further includes a fork shaft 42 (FIG. 6) and a shift fork 43. The first engagement sleeve 41 includes an inner spline 411, the outer spline 412 and an annular groove 417. The inner spline 411 of the first engagement sleeve 41 engages with an outer spline of the intermediate spline hub 211, and the first engagement sleeve 41 is slidably mounted on the intermediate spline hub 211 of the second input shaft 21. The inner spline 411 engages selectively with the outer spline 202 of the first input shaft 20, so that when the first engagement sleeve 41 is moved to the left in FIG. 5 the inner spline 411 engages with the outer spline 202 of the first input shaft 20. Concurrently, the outer spline 412 of the engagement sleeve 41 is positioned apart from the inner spline 351 of the gear plate 35. Accordingly, the rotation of the first input shaft 20 is not reduced by the epicycle reduction gear unit 30, and the rotation of the first input shaft 20 is transmitted to the second input shaft 21 through only the first engagement sleeve 41.

Therefore, when the first engagement sleeve 41 is positioned in a high-speed driving condition "H" in FIG. 5, the second input shaft 21 rotates with the first input shaft 20 at a high speed. On the other hand, when the first engagement sleeve 41 is positioned in a low-speed driving condition "L" in FIG. 5, the inner spline 411 of the first engagement sleeve 41 is positioned apart from the outer spline 202 of the first input shaft 20 and the outer spline 412 of the first engagement sleeve 41 engages with the inner spline 351 of the gear plate 35. As a result, the second input shaft 21 rotates with the first input shaft 20 at a low speed through the epicycle reduction gear unit 30.

Figure 6:
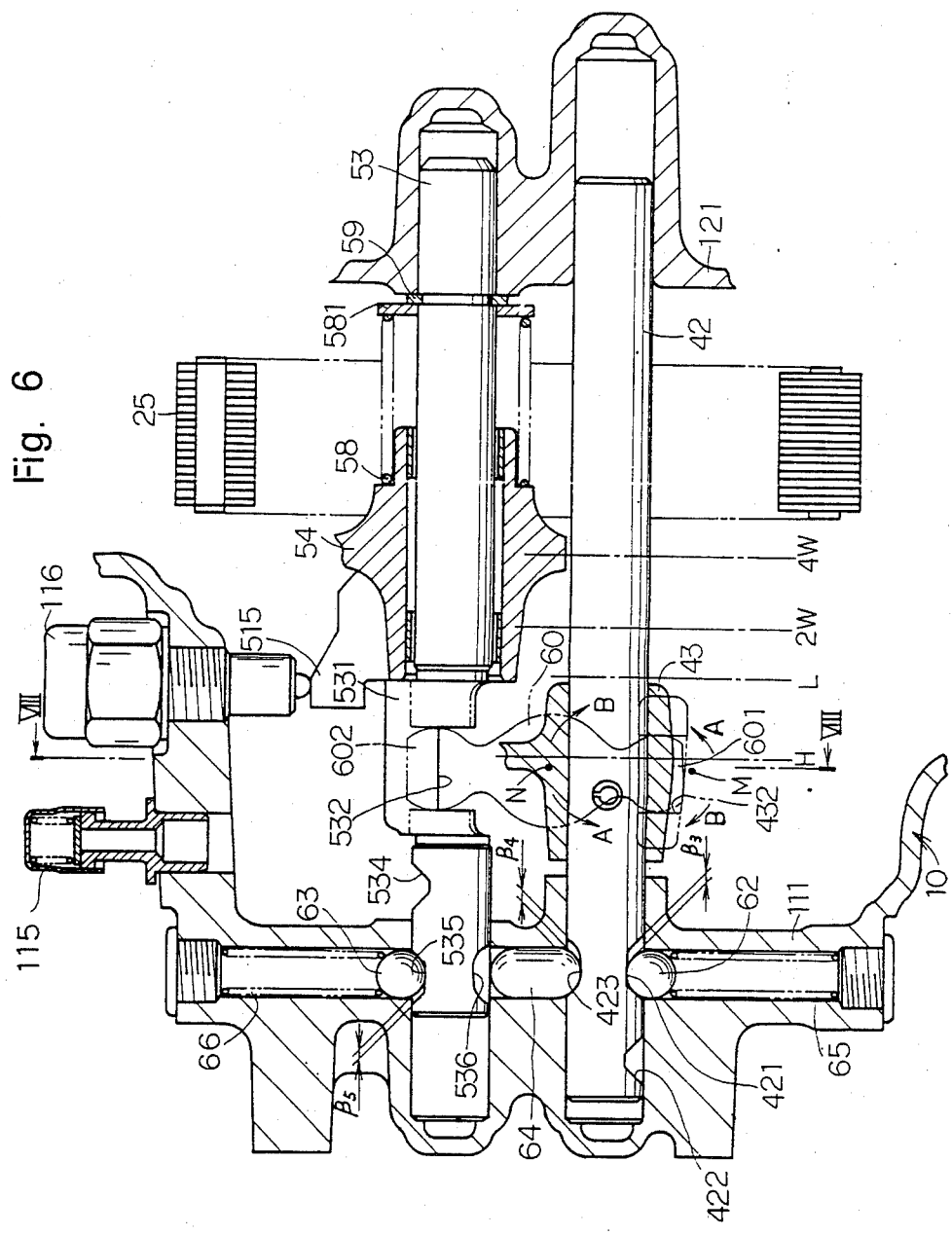
FIG. 6 is a further enlarged cross-sectional view of the components of the high-low speed drive shift mechanism and the two-four wheel drive shift mechanism taken along the line VI—VI in FIG. 2, wherein a first fork shaft of the high-low drive shift mechanism is positioned in the high speed drive condition and a second fork shaft of the two-four wheel drive shift mechanism is positioned in the four wheel drive condition.
Figure 7:
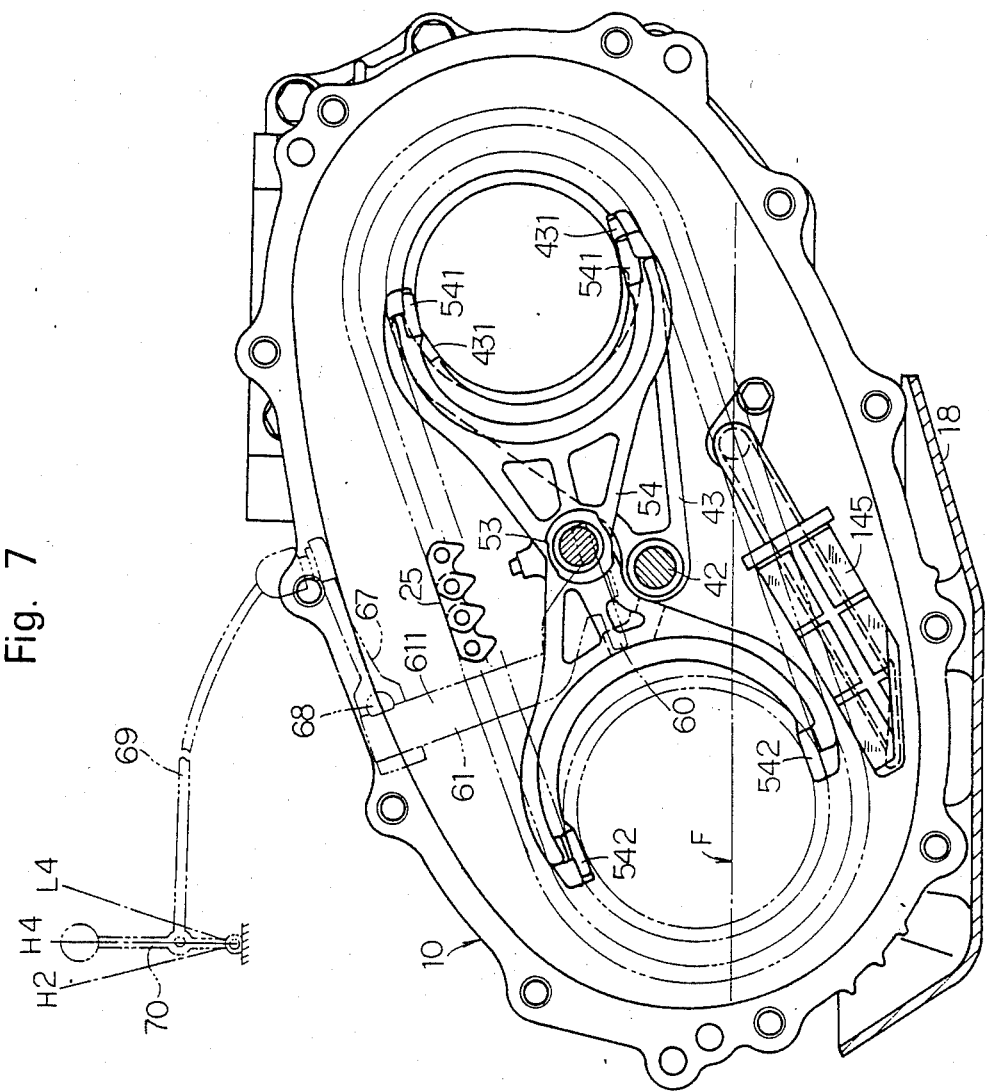
FIG. 7 is an enlarged cross-sectional view of the transfer casing taken along the line VII—VII in FIG. 4.

As shown in FIG. 6, the fork shaft 42 of the high-low speed shift mechanism 40 is located between the second input shaft 21 and the output shaft 22, and the fork shaft 42 is located parallel to both the input second input shaft 21 and the output shaft 22. The fork shaft 42 is slidably mounted on both the left wall 111 and the right wall 121 of the transfer casing 10, and the shift fork 43 is secured to an intermediate portion of the fork shaft 42. As shown in FIG. 7, the shift fork 43 includes a pair of engagement fingers 431 which engage with the annular groove 417 of the first engagement sleeve 41. When the fork shaft 42 is moved by a swing arm 60 in the axial direction thereof, the fork shaft 42 forces the first engagement sleeve 41 to move in the axial direction of the fork shaft 42.

As shown in FIG. 4, a two-four wheel drive shift mechanism 50 includes a second engagement sleeve 51, a third engagement sleeve 52, a fork shaft 53 and a shift fork 54. The second engagement sleeve 51 includes an inner spline 511 and an annular groove 517, and the inner spline 511 engages with the outer spline of the intermedicate spline hub 211 of the second input shaft 21. The second engagement sleeve 51 is slidably mounted on the intermediate spine hub 211, and the second engagement sleeve 51 engages selectively with an outer spline 231 of the driving sprocket wheel 23.

Accordingly, when the second engagement sleeve 51 is positioned in a four wheel driving condition "4W" in FIG. 5 (i.e., the second engagement sleeve 51 is moved to the right as shown in FIGS. 4 and 5), the inner spline 511 engages with both the outer spline of the intermediate spline hub 211 of the second input member 21 and the outer spline 231 of the driving sprocket wheel 23. As a result, the second input shaft 21 rotates with the driving sprocket wheel 23 and the rotation of the second input shaft 21 is transmitted to the driving sprocket wheel 23 and the chain 25.

On the other hand, when the second engagement sleeve 51 is positioned in a two wheel driving condition "2W" in FIG. 5 (i.e., the second engagement sleeve 51 is moved to the left), the second engagement sleeve 51 is positioned apart from the driving sprocket wheel 23. As a result, the driving sprocket wheel 23 and the chain 25 are not driven.

The third engagement sleeve 52 includes an inner spline 521 and an annular groove 527. The inner spline 521 engages with an outer spline 223a of a clutch hub 222 which is securely mounted on the output shaft 22. The third engagement sleeve 52 is slidably mounted on the clutch hub 222, and the inner spline 521 engages selectively with an outer spline 241 of the driven sprocket wheel 24.

Accordingly, when the third engagement sleeve 52 is positioned in the four wheel driving condition "4W" in FIG. 4, the inner spline 521 of the third engagement sleeve 52 engages with the outer spline 241 of the driven sprocket wheel 24. As a result, the output shaft 22 rotates with the driven sprocket wheel 24 and the rotation of the driven sprocket wheel 24 is transmitted to the output shaft 22 through the third engagement sleeve 52.

On the other hand, when the third engagement sleeve 52 is positioned in the two wheel driving condition "2W" in FIG. 4, the third engagement sleeve 52 is positioned apart from the driven sprocket wheel 24. As a result, the rotation of the driven sprocket wheel 24 is not transmitted to the output shaft 22.

Further, the driven sprocket wheel 24 includes a tapered portion 242 and a synchronizer ring 55 of a synchronizer clutch assembly is mounted on the tapered portion 242. The synchronizer clutch assembly includes the synchronizer ring 55, a shifting key 56 and key springs 57, and the synchronizer clutch assembly is located within an inner hole of the third engagement sleeve 52. When the second and third engagement sleeves 51 and 52 are shifted from the two wheel driving condition "2W" to the four wheel driving condition "4W" (i.e., before the second engagement sleeve 51 engages with the outer spline 231 of the driving sprocket wheel 23), the synchronizer clutch assembly synchronizes the driving and driven sprocket wheels 23 and 24 and the chain 25, with the output shaft 22 rotating in accordance with a vehicle speed.

The third engagement sleeve 52 and the synchronizer clutch assembly are effective even when a vehicle does not include a free-wheel hub mechanism which makes the driven wheels free from a transmission of torque on a trans-axle shaft of the vehicle, or even when an operator does not make the driven wheels free from the transmission of torque on the trans-axle shaft by operation of the free-wheel hub mechanism in the vehicle which includes the free-wheel hub mechanism.

As shown in FIG. 7, an oil is poured up to a predetermined level "F" in the transfer casing 10. Further, an oil strainer 145 is located within the transfer casing 10, and the oil strainer 145 communicates with the oil pump 141 through an oil passage defined between the left wall 111 of the transfer casing 10 and the pump body 14. Accordingly, a part of the third engagement sleeve 52 and one of the engagement fingers 542 are located in the oil, whereby because of better lubrication of a contact surface between the engagement fingers 542 and the engagement groove 527 of the third engagement sleeve 52, little friction is caused on the contact surface.

In the two wheel driving condition, the third engagement sleeve 52 and the synchronizer clutch assembly can make the driving and driven sprocket wheels 23 and 24 and the chain 25 free from the transmission of torque on the output shaft 22. As a result, the third engagement sleeve 52 and the synchronizer clutch assembly can prevent the temperature in the transfer casing 10 from increasing, and they can prevent the oil in the transfer casing 10 from being churned by the driven sprocket wheel 24 and the chain 25. Further, they can prevent the driving and driven sprocket wheels 23 and 24 and the chain 25 from making noise and from being worn away.

Furthermore, a fin 524 is secured to an outer surface of the third engagement sleeve 52, and when the driven sprocket wheel 24 rotates with the output shaft 22 the fin 524 scatters the oil to upper members located within the transfer casing 10.

As shown in FIG. 6, the fork shaft 53 of the two-four wheel drive shift mechanism 50 is located parallel to the fork shaft 42 of the high-low speed shift mechanism 40, and the shift fork 54 is slidably mounted on an intermediate portion of the fork shaft 53.

The fork shaft 53 is slidably mounted on the left and right walls 111 and 121 of the transfer casing 10. The shift fork 54 is biased to the left by a spring 58. A shift head 531 projects in the lateral direction of the fork shaft 53, and the shift fork 54 is in contact with a right end of the shift head 531 of the fork shaft 53. A retainer 581 is secured to the fork shaft 53 by a snap ring 59, and the spring 58 is located between the retainer 581 and the shift fork 54.

Further, an engagement recess 532 is defined within the shift head 531 of the fork shaft 53, and a second end 602 of the swing arm 60 is inserted in and engages with the engagement recess 532 of the fork shaft 53.

As shown in FIG. 7, the shift fork 54 includes two pairs of engagement fingers 541 and 542 which extend in the lateral direction of the fork shaft 53 to the annular grooves 517 and 527 of the engagement sleeves 51 and 52. Accordingly, when the shift fork 54 is moved in the axial direction of the fork shaft 53 the engagement sleeves 51 and 52 are forced to move respectively in the axial directions of the second input shaft 21 and the output shaft 22.

Figure 8:
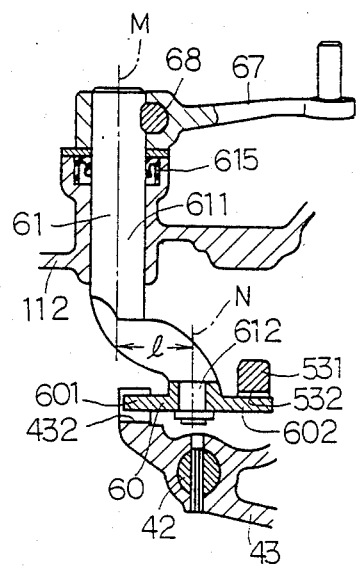
FIG. 8 is an enlarged cross-sectional view of the components of the high-low speed drive shift mechanism and the two-four wheel drive shift mechanism, wherein both ends of a swing arm are located respectively within engagement recesses of the first and second fork shafts.

Furthermore, as shown in FIGS. 6 and 8, the swing arm 60 includes a first end 601, and the first end 601 is inserted in and engages with an engagement recess 432 of the shift fork 43. The swing arm 60 is rotatably mounted on an eccentric shaft portion 612 of a rod 61, and the main shaft portion 611 of the rod 61 is rotatably mounted on a boss portion 112 of the transfer casing 10. A sealing member 615 is located between the boss portion 112 and the main shaft portion 611 of the rod 61, and the sealing member 615 prevents the oil from leaking out from the transfer casing 10. The eccentric shaft portion 612 extends parallel to the main shaft portion 611, and the eccentric shaft portion 612 is located apart from the main shaft portion 611 by a distance "l". (i.e., the distance "l" being defined between a central axis "M" of the main shaft portion 611 and a central axis "N"). An end of the main shaft portion 611 of the rod 61 projects out of the transfer casing 10, and the end of the rod 61 is secured to an outer lever 67 by a tapered pin 68.

As shown in FIG. 7, the outer lever 67 is connected to a transfer lever 70 through a push-pull cable 69. The transfer lever 70 is located in a passenger compartment of the vehicle, and when the transfer lever 70 is moved in the longitudinal direction of the vehicle the push-pull cable 69 forces the outer lever 67 to move about the main shaft portion 611 of the rod 61, thereby rotating rod 61.

As shown in FIG. 6, the first fork shaft 42 includes a first notch 421, a second notch 422 and a third notch 423, and a first locking ball 62 is selectively inserted in one of the first and second notches 421 and 422. The first locking ball 62 is biased to the first fork shaft 42 by a spring 65 which is located within the left wall 111 of the transfer casing 10.

The second fork shaft 53 includes a fourth notch 534, a fifth notch 535 and a sixth notch 536, and a second locking ball 63 is selectively inserted in one of the fourth and fifth notches 534 and 535. The second locking ball 63 is biased to the second fork shaft 53 by a spring 66 which is located within the left wall 111 of the transfer casing 10. An interlock pin 64 is selectively inserted in either the third notch 423 of the first fork shaft 42 or the sixth notch 536 of the second fork shaft 53.

A width of the first notch 421 of the first fork shaft 42 is greater than a width of the second notch 422 by a third distance "$\beta_3$", so that even when the first locking ball 62 is inserted in the first notch 421 the first locking ball 62 is positioned apart from a right side of first notch 421 by the third distance "$\beta_3$".

The third distance "$\beta_3$" is equal to or longer than the first gap "$\beta_1$", shown in FIG. 5, defined between the first engagement sleeve 41 and the sun gear 31 (e.g., the third distance "$\beta_3$" is 1 mm-2 mm in this embodiment). The first notch 421 is located between the second notch 422 and the first shift fork 43. The first notch 421 is located apart from the first shift fork 43 by a first predetermined length in the longitudinal direction of the first fork shaft 42. The third notch 432 is located apart from the first shift fork 43 by the first predetermined length in the longitudinal direction of the first fork shaft 42 and at an opposite side of the first fork shaft 42 in the lateral direction thereof against the first notch 421. A width of the third notch 423 is greater than a width of the interlock pin 64 by a fourth distance "$\beta_4$", so that even when the interlock pin 64 is inserted in the third notch 423 the interlock pin 64 is positioned apart from a right side of the third notch 423 by the fourth distance "$\beta_4$".

The fourth distance "$\beta_4$" is substantially the same length as the third distance "$\beta_3$" (i.e., $\beta_3 \approx \beta_4 > \beta_1$). A width of the fifth notch 535 of the second fork shaft 53 is greater than a width of the fourth notch 534 by a fifth distance "$\beta_5$", so that even when the second locking ball 63 is inserted in the fifth notch 535 the second locking ball 63 is positioned apart from a left side of the fifth notch 535 by the fifth distance "$\beta_5$".

The fifth distance "$\beta_5$" is equal to or longer than the second gap "$\beta_2$", shown in FIG. 5, defined between the second engagement sleeve 51 and the driven sprocket wheel 23 (e.g., the fifth distance "$\beta_5$" is 1 mm-2 mm in this embodiment). The fourth notch 534 is located between the fifth notch 535 and the shift head 531. The fifth notch 535 is located apart from the shift head 531 by a second perdetermined length in the longitudinal direction of the second fork shaft 53.

The sixth notch 536 is located apart from the shift head 531 by the second predetermined length in the longitudinal direction of the second fork shaft 53 and at an opposite side of the second fork shaft 53 in the lateral direction thereof against the fifth notch 535.

The sixth notch 536 of the second fork shaft 53 faces to the third notch 423 of the first fork shaft 42, and an aperture is defined between the sixth notch 536 and the third notch 423 within the left wall 111 of the transfer casing 10. The interlock pin 64 is located within the aperture, and the interlock pin 64 selectively engages with either the sixth notch 536 of the second fork shaft 53 and the third notch 423 of the first fork shaft 42.

When the transfer lever 70 is positioned at a first position "H4" in FIG. 7, as shown in FIG. 6 the first fork shaft 42 is positioned in the high speed driving condition "H" and the second fork shaft 53 is positioned in the four wheel driving condition "4W". Concurrently, as shown in FIG. 5, when the first engagement sleeve 41 is positioned in the high-speed driving condition "H", and when the second and third engagement sleeves 51 and 52 are positioned in the four wheel driving condition "4W", the first input shaft 20 is securely connected to the second input shaft 21, the second input shaft 21 is securely connected to the driving sprocket wheel 23, and the output shaft 22 is securely connected to the driven sprocket wheel 24.

Accordingly, the vehicle may drive at a high speed in the four wheel driving condition.

In this condition, a left end of the first engagement sleeve 41 is positioned apart from a right end of the sun gear 31 of the epicycle reduction gear unit 30 by the first distance "$\beta_1$", and the first fork shaft 42 is prevented from moving to the right in the axial direction thereof by the first locking ball 62.

Concurrently, a right end of the second engagement sleeve 51 is positioned apart from a left end of the driving sprocket wheel 23 by the second distance "$\beta_2$", and a right end of the third engagement sleeve 52 is positioned apart from a left end of the driven sprocket wheel 24 by the second distance "$\beta_2$". The second fork shaft 53 is prevented from moving to the left in the axial direction thereof by the second locking ball 63.

It is apparent to those skilled in the art that the prevent the second fork shaft 53 is prevented from moving to the right by contact of the snap ring 59 with the right wall 121 of the transfer casing 10.

Further, in FIG. 6 an air bleed valve 115 and a detecting switch 116 for detecting the four wheel driving condition "4W" are located on the left wall 111 of the transfer casing 10. The detecting switch 116 includes a contact point which is in contact with a projection 515 of the second engagement sleeve 51 in the four wheel driving condition "4W".

Figure 9:
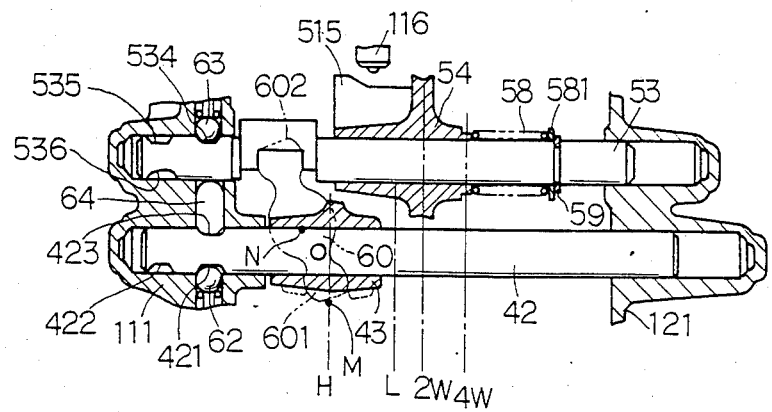
FIG. 9 is an enlarged cross-sectional view of the components shown in FIG. 6, wherein the first fork shaft is positioned in a high speed drive condition and the second fork shaft is positioned in a two-wheel drive condition.

When the transfer lever 70, shown in FIG. 7, is positioned at a second position "H2", the push-pull cable 69 and the outer lever 67 are pulled, whereby the main shaft portion 611 of the rod 61 rotates about the central axis "M". When the main shaft portion 611 rotates in the counter-clockwise direction "A", the swing arm 60 swings in the counter-clockwise direction "A" about the central axis "M". As a result, the second end 602 of the swing arm 60 forces the second fork shaft 53 to move to the left as shown in FIG. 9, and the second fork shaft 53 is changed from the four wheel driving condition "4W" to the two wheel driving condition "2W". In this condition, when the large torque is not applied to the second and third engagement sleeve 51 or 52, the second shift fork 54 is immediately pushed with the second and third engagement sleeves 51 and 52 to the two wheel driving condition "2W" by the spring 58. If the large torque is applied to the second and third engagement sleeves 51 and 52, after the large torque is lessened the second shift fork 54 is pushed with the second and third engagement sleeves 51 and 52 to the two wheel driving condition "2W" by the spring 58.

Accordingly, the second and third engagement sleeves 51 and 52 are moved to the two wheel driving condition "2W" in FIG. 4, and then the second input shaft 21 and the output shaft 22 are respectively disconnected from the driving and driven sprocket wheels 23 and 24. Therefore, the vehicle may drive at a high speed in the two wheel driving condition.

Further, the contact point of the detecting switch 116 is not in contact with the projection 515 of the second shift fork 54.

In FIG. 9, the first fork shaft 42 is prevented from moving in the axial direction thereof by the interlock pin 64 and the first locking ball 62, so that when the transfer lever 70 is operated from the second position "H2" to the first position "H4" in FIG. 7, the second end 602 of the swing arm 60 is swung in the clockwise direction about the central axis "M" of the main shaft portion 611 of the rod 61. As a result, the second fork shaft 53 is moved in the axial direction to the right from the two wheel driving condition "2W" shown in FIG. 9 to the four wheel driving condition "4W" shown in FIG. 6.

On the other hand, when the transfer lever 70 is operated from the first position "H4" to a third position "L4" shown in FIG. 7, the push-pull cable 69 and the outer lever 67 are pulled, the main shaft portion 611 of the rod 61 rotates in the clockwise direction "B" in FIG. 6 about the central axis "M" thereof, and concurrently the interlock pin 64 is inserted in the sixth notch 536 of the second fork shaft 53, whereby the eccentric shaft portion 612 moves in the clockwise direction "B". However, the second fork shaft 53 is prevented from moving to the right by the interlock pin 64 and the second locking ball 63. Accordingly, the swing arm 60 rotates in the counter-clockwise direction about the central axis "N" of the eccentric shaft portion 612, whereby the first end 601 of the swing arm 60 is swung in the counter-clockwise direction about the second end 602 thereof and the engagement recess 532. Therefore, the first shift fork 43 and the first fork shaft 42 are moved to the right from the high speed driving condition "H" to the low-speed driving condition "L" shown in FIG. 10. As a result, the first engagement sleeve 41 is moved to the right.

The outer spline 412 of the first engagement sleeve 41 engages with the inner spline 351 of the gear plate 35 and the inner spline 411 of the first engagement sleeve 41 disengages from the outer spline 202 of the first input shaft 20. The first input shaft 20 is connected to the second input shaft 21 through the epicycle reduction gear unit 30.

Accordingly, the vehicle may drive at the low speed in the four wheel driving condition.

Furthermore, the contact point of the detecting switch 116 is in contact with the projection 515 of the second shift fork 54.

Figure 10:
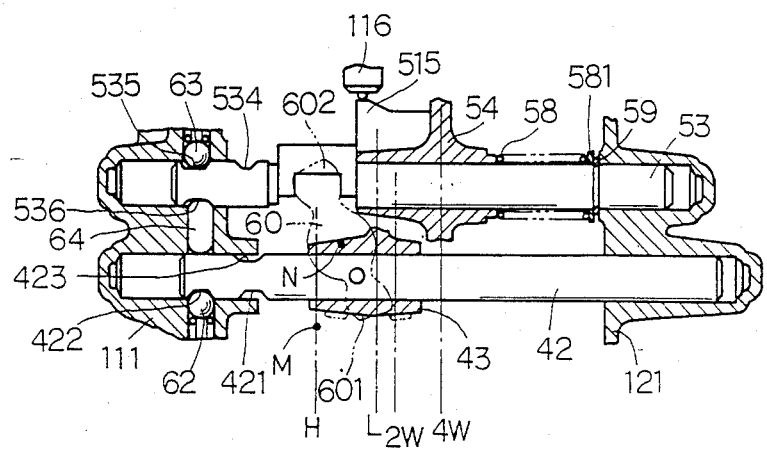
FIG. 10 is an enlarged cross-sectional view of the components shown in FIG. 6, wherein the first fork shaft is positioned in a low speed drive condition and the second fork shaft is positioned in a four wheel drive condition.

Further, in FIG. 10 the interlock pin 64 is inserted in the sixth notch 536, so that the second fork shaft 53 is prevented from moving to the left in the axial direction thereof. As a result, when the transfer lever 70, shown in FIG. 7, is operated from the third position "L4" to the first position "H4", the first end 601 of the swing arm 60 rotates in the clockwise direction about the second end 602 of the swing arm 60 from the low-speed driving condition "L" to the high-speed driving condition "H" shown in FIG. 6.

As shown in FIGS. 11 through 18, a plurality of disengagement preventing mechanisms are respectively provided between the first input shaft 20 and the first engagement sleeve 41 and between the second engagement sleeve 51 and the driving sprocket wheel 23. The disengagement preventing mechanisms prevent the first and second engagement sleeves 41 and 51 from disengaging respectively from the first input shaft 20 and the driving sprocket wheel 23 at the respective driving condition.

As shown in FIGS. 11 through 14, a first disengagement preventing mechanism 701 includes a pair of chamfers 203 and a pair of tapered surfaces 204 on the outer spline 202 of the first input shaft 20, and a pair of chamfers 413 and a pair of tapered surfaces 414 on the inner spline 411 of the first engagement sleeve 41.

The pair of chamfers 203 are defined on a right end of the outer spline 202, and the pair of tapered surfaces 204 are defined in the vicinity of the pair of chamfers 203. Each of the tapered surfaces 204 is inclined to a longitudinal center line of the outer spline 202 by a first angle $\theta_1$.

On the other hand, the pair of chamfers 413 are defined on a left end of the inner spline 411, and the pair of tapered surfaces 414 are defined in the vicinity of the pair of chamfers 413. Each of the tapered surfaces 414 is inclined to a longitudinal center line of the inner spline 411 by a second angle $\theta_2$.

When the outer spline 202 of the first input shaft 20 engages with the inner spline 411 of the first engagement sleeve 41, and when the torque is applied to the first input shaft 20, each of the tapered surfaces 204 of the first input shaft 20 is in contact with each of the tapered surfaces 414 of the first engagement sleeve 41, and the first engagement sleeve 41 is driven. The tapered surfaces 414 of the first engagement sleeve 41 are inclined by the second angle $\theta_2$, so that when the torque is applied to the first input shaft 20 the torque causes a divided thrust force directed to the first input shaft 20 on the first engagement sleeve 41.

Accordingly, when the torque is applied to the first input shaft 20 the first engagement sleeve 41 cannot disengage from the first input shaft 20 due to the divided thrust force.

In the similar manner, as shown in FIGS. 15 through 18, a second disengagement preventing mechanism 702 includes a pair of chamfers 233 and a pair of tapered surfaces 234 on the outer spline 231 of the driving sprocket wheel 23, and a pair of chamfers 513 and a pair of tapered surfaces 514 on the inner spline 511 of the second engagement sleeve 51. The pair of chamfers 233 are defined on a left end of the outer spline 231, the pair of tapered surfaces 234 are defined in the vicinity of the pair of chamfers 233. Each of the tapered surfaces 234 is inclined to a longitudinal center line of the outer spline 231 by a fourth angle $\theta_4$.

On the other hand, the pair of chamfers 513 are defined on a right end of the inner spline 511, and the pair of tapered surfaces 514 are defined in the vicinity of the pair of chamfers 513. Each of the tapered surfaces 514 is inclined to a longitudinal center line of the inner spline 511 by a third angle $\theta_3$.

When the outer spline 231 of the driving sprocket wheel 23 engages with the inner spline 511 of the second engagement sleeve 51, and when the torque is applied to the second engagement sleeve 51 through the second input shaft 21, each of the tapered surfaces 234 of the driving sprocket wheel 23 is in contact with each of the tapered surfaces 514 of the second engagement sleeve 51, and the driving sprocket wheel 23 is driven.

The tapered surfaces 234 of the driving sprocket wheel 23 are inclined by the fourth angle $\theta_4$, so that when the torque is applied to the second engagement sleeve 51 the torque causes a divided thrust force directed to the driving sprocket wheel 23 on the second engagement sleeve 51.

Accordingly, when the torque is applied to the second engagement sleeve 51, the second engagement sleeve 51 cannot disengage from the driving sprocket wheel 23.

Further, the disengagement preventing mechanisms are provided between the inner spline 351 of the gear plate 35 and the outer spline 412 of the first engagement sleeve 41 and between the outer spline 241 of the driven sprocket wheel 24 and the inner spline 521 of the third engagement sleeve 52.

Furhtermore, as shown in FIGS. 11 and 12, a projection 205 and a groove 206 are defined at the outer spline 202 of the first input shaft 20. The projection 205 is defined at a left end of the outer spline 202, and the groove 206 is defined in the vicinity of the tapered surfaces 204. The sun gear 31 of the epicycle reduction gear unit 30 is secured to the first input shaft 20 by the projection 205 and a snap ring which is located within the groove 206.

As shown in FIG. 5, normally the first distance "$\beta_1$" is defined between the sun gear 31 of the epicycle reduction gear unit 30 and the first engagement sleeve 41, and in the high-speed driving condition "H" the first engagement sleeve 41 is forced to move to the left by the divided thrust force caused by the disengagement preventing mechanism 701. The thrust force is transmitted to the first input shaft 20 through the projection 205 thereof, shown in FIG. 11; further, the thrust force is transmitted to the pump body 14 secured to the transfer casing 10 through a thrust bearing 821, the planet carrier 34 and the bearing 811.

In a similar manner, normally the second distance "$\beta_2$" is defined between the second engagement sleeve 51 and the driving sprocket wheel 23, and in the four-wheel driving condition "4W" the second engagement sleeve 51 is forced to move to the right by the divided thrust force caused by the disengagement preventing mechanism 702. The thrust force is transmitted from the driving sprocket wheel 23 to the extension housing 16 secured to the transfer casing 10 through a spacer 825 and the bearing 815.

Further a distance is defined between the third engagement sleeve 52 and the driven sprocket wheel 24, and in the similar manner the thrust force is transmitted to the transfer casing 10.

Furthermore, a thrust bearing 822 is located between the first input shaft 20 and the second input shaft 21, and a pair of thrust bearings 823 and 824 are located between the plurality of planet gears 33 and the planet carrier 34.

Gaps defined between the engagement fingers 431, 541 and 542 of the first and second fork shafts 43 and 53, and the engagement grooves 417, 517 and 527 of the first through third engagement sleeves 41, 51 and 52, are smaller than the first and second distances "$\beta_1$" and "$\beta_2$".

As mentioned above, the disengagement preventing mechanism 701 is provided between the first engagement sleeve 41 of the high-low speed shift mechanism 40 and the first input shaft 20, and the disengagement preventing mechanism 702 is provided between the second engagement sleeve 51 of the two-four wheel drive shift mechanism 50 and the driving sprocket wheel 23.

Accordingly, when the torque is applied to the first input shaft 20 and the second input shaft 21, the first and second engagement sleeves 41 and 51 are forced to move respectively to the first input shaft 20 and the driving sprocket wheel 23 by the divided thrust forces caused on the tapered surfaces 414 and 514 of the first and second engagement sleeves 41 and 51.

As a result, the first shift fork 43 and the first fork shaft 42 are forced to move against the locking ball 62 which is biased by the spring 65. As shown in FIG. 6, the third distance "$\beta_3$" is defined between the first locking ball 62 and the right side of the first notch 421, and the fourth distance "$\beta_4$" is defined between the interlock pin 64 and the right side of the third notch 423, so that the first fork shaft 42 can move to the left in the longitudinal direction thereof without a large amount of friction.

Accordingly, the first end 601 of the swing arm 60 is rotated in the clockwise direction "B", and then the second end 602 of the swing arm 60 is swung in the clockwise direction.

Therefore, the second fork shaft 53 is forced to move to the right. In this condition, the fifth distance "$\beta_5$" is defined between the second locking ball 63 and the left side of the fifth notch 535, so that the second fork shaft 53 can move to the right without a large amount of friction.

On the other hand, the second shift fork 54 is moved on the second fork shaft 53 to the right by the divided thrust force.

Accordingly, the first fork shaft 42 includes the wide first and third notches 421 and 423, and the second fork shaft 53 includes the wide fifth notch 535, so that the high-low speed shift mechanism 40 and the two-four wheel drive shift mechanism 50 can prevent expected drawbacks caused by the disengagement preventing mechanisms 701 and 702.

The expected drawbacks are disclosed hereinafter. Suppose that the first fork shaft 42 includes normal size first and third notches instead of the wide first and third notches 421 and 423, and that the second fork shaft 53 includes a normal size fifth notch instead of the wide fifth notch 535. When the first shift fork 43 and the first fork shaft 42 are forced to move against the first locking ball 62, the spring 65 and the first locking bull 62 cause an axial force which is directed in the opposite direction of the divided thrust force on the first fork shaft 42, because a right side of the normal size notch is in contact with the first locking ball 62.

Accordingly, the axial force and the thrust force are applied to a contact surface defined between the engagement groove 417 of the first engagement sleeve 41 with the engagement fingers 431 of the first shift fork 43 during rotation of the first engagement sleeve 41, and then the engagement fingers 431 of the first shift fork 43 move within the engagement groove 417 in the longitudinal direction thereof.

Therefore, friction is caused on the contact surface of the first engagement sleeve 41 with the engagement fingers 431 of the first shift fork 43 during rotation of the first engagement sleeve 41. The friction caused on the contact surface may produce sludge, and the sludge may penetrate into gaps defined between bearings and shafts, whereby the sludge may reduce the duration of the bearings.

Further, the friction may wear the contact surface, so that a distance defined between the engagement fingers 431 of the first shift fork 43 and the engagement groove 417 of the first engagement sleeve 41 is enlarged. As a result, while the engagement fingers 431 of the first shift fork 43 move within the distance, the first engagement sleeve 41 cannot be moved by the first shift fork 43.

Accordingly, the distance deteriorates the shift feeling because of time lag of response of the movement of the first engagement sleeve 41.

Furthermore, collision of the engagement fingers 431 of the first shift fork 43 with the engagement groove 417 of the first engagement sleeve 41 makes noise.

In a similar manner, the expected drawbacks are caused on a contact surface defined between the engagement groove 517 of the second engagement sleeve 51 with the engagement fingers 541 of the second shift fork 54 during rotation of the second engagement sleeve 51.

However, in the high-low speed shift mechanism 40 and the two-four wheel drive shift mechanism 50 according to the present invention, the first fork shaft 42 includes the wide first and third notches 421 and 423 and the second fork shaft 53 includes the wide fifth notch 535, so that the first and second fork shafts 42 and 53 can move in the longitudinal direction thereof without a large amount of friction. As a result, the sludge is not produced by the friction.

Figure 19:
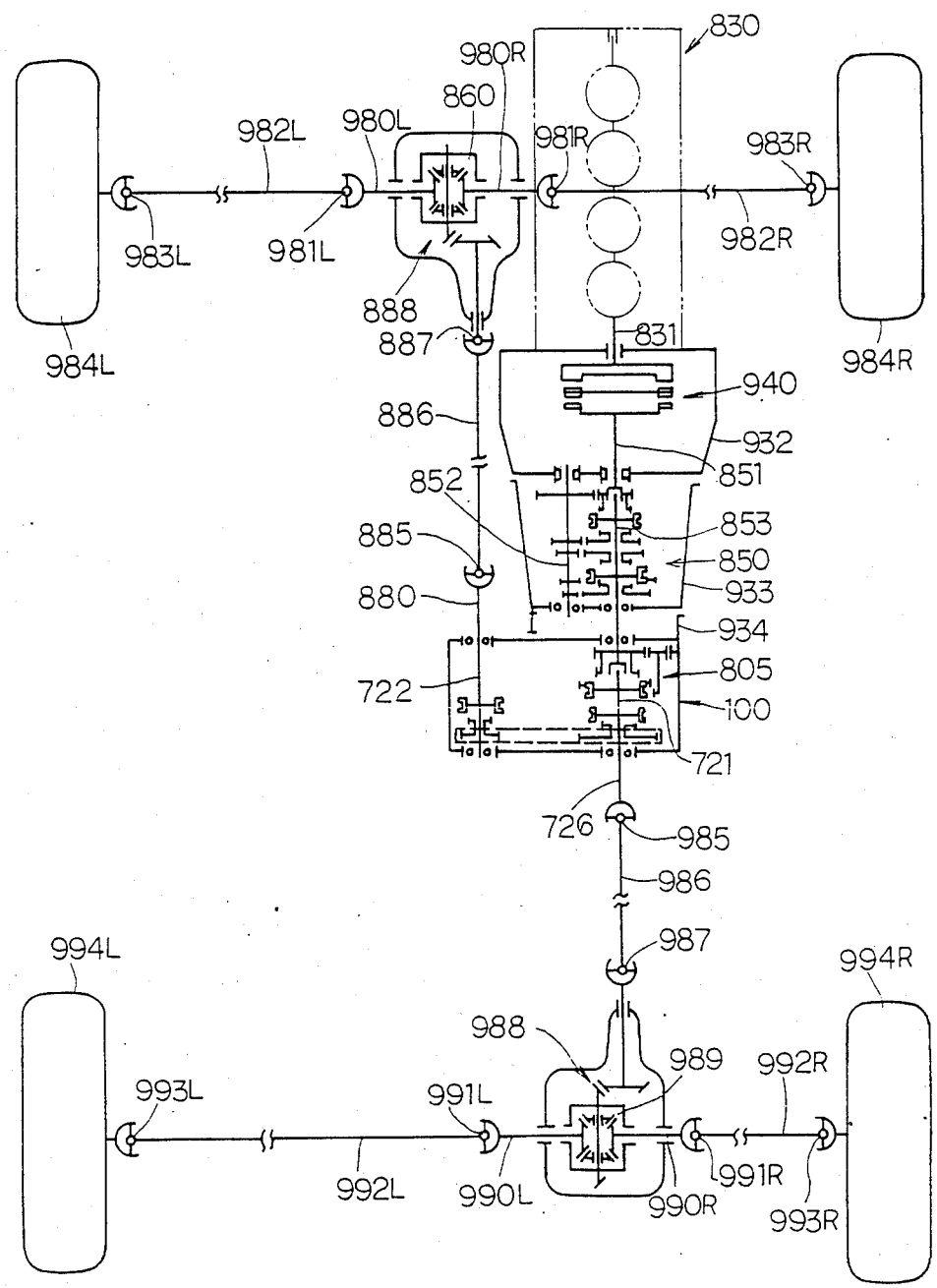
FIG. 19 is a schematic plan view showing a second embodiment of a four-wheel drive system according to the present invention.
Figure 20:
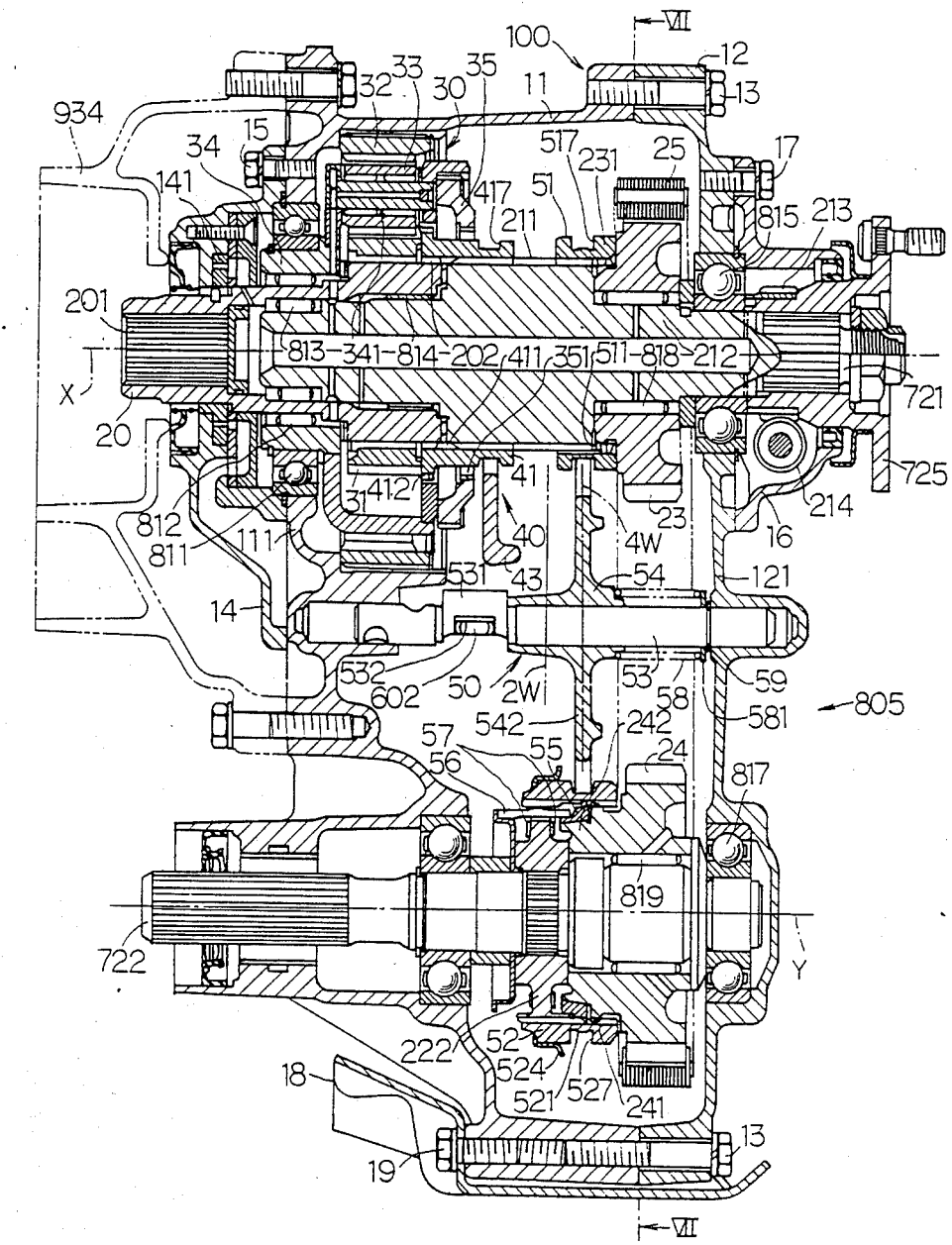
FIG. 20 is an enlarged cross-sectional view of a transfer casing, wherein a first engagement sleeve of a high-low speed drive shift mechanism is positioned in a high speed drive condition and a second engagement sleeve of a two-four wheel drive shift mechanism is positioned in a four-wheel drive condition.

FIGS. 19 and 20 disclose a second embodiment of the present invention, wherein, in comparison with the first embodiment disclosed above, an engine 830, a transmission unit 850, a transfer gear shift mechanism 805 and a front wheel differential gear assembly 860 are modified. Differences between the first embodiment and the second embodiment are discussed hereinafter.

As shown in FIG. 19, the engine 830 is located in the front portion along the longitudinal direction of the vehicle, and a crank shaft 831 of the engine 830 is located perpendicular to the lateral direction of the vehicle. The transmission unit 850 is located at a rear end of the engine 830, and an input shaft 851 of the transmission 850 is located on an extended portion of a rotational center axis of the crank shaft 831. The input shaft 851 is rotatably mounted on a clutch housing 932, and the clutch housing 932 is located between a transmission casing 933 and the engine 830. A clutch 940 is located within the clutch housing 932, and the clutch 940 has a center axis which is located on the extended portion of the rotational center axis of the crank shaft 831 and the iput shaft 851. A counter shaft 852 of the transmission 850 is located parallel to the input shaft 851, and the counter shaft 852 is located within the transmission casing 933. An output shaft 853 is located parallel to the counter shaft 852, and the output shaft 853 is coaxial with the input shaft 851. The counter shaft 852 and output shaft 853 are rotatably mounted on the transmission casing 933. The output shaft 853 is secured to an input shaft 20 of the transfer gear shift mechanism 805.

A transfer casing 100 is located at a rear side of the transmission casing 933, and an adapter casing 934 is located between the transmission casing 933 and the transfer casing 100.

The transfer gear shift mechanism 805 is located within the transfer casing 100 which is shown in detail in FIG. 20. A first output shaft 721 of the transfer gear shift mechanism 805 is connected to a rear first universal coupling unit 985 through a first intermediate shaft 726, so that the torque on the first output shaft 721 is transmitted to a rear wheel differential gear assembly 989. The torque is then transmitted to a pair of rear wheels 994L and 994R.

In a similar manner, a second output shaft 722 of the transfer gear shift mechanism 805 is connected to a front first universal coupling unit 885 through a second intermediate shaft 880. A rear end of a propeller shaft 886 is connected to the first universal coupling unit 885, and a front end of the propeller shaft 886 is connected to a front final reduction gear 888 through the second universal coupling unit 887.

The front final reduction gear 888 engages with a front wheel differential gear assembly 860, and the front wheel differential gear assembly 860 includes a pair of side bevel gears.

Accordingly, the torque on the second output shaft 722 is transmitted to the front wheel differential gear assembly 860. The torque is then transmitted to a pair of front wheels 984L and 984R.

As shown in FIG. 20, the transfer gear shift mechanism 805 includes an input shaft 20, the first output shaft 721, the second output shaft 722, a driving sprocket wheel 23, a chain 25, an epicycle reduction gear unit 30, a high-low speed shift mechanism 40 and a two-four wheel drive shift mechanism 50.

The first output shaft 721 is similar to the second input shaft 21 of the first embodiment, but a right end of the first output shaft 721 has a plurality of outer splines which engage securely with a plurality of inner splines of a retainer 725. The retainer 725 is secured to the first embodiment shaft 726 which is connected to the rear first universal coupling unit 985.

Further, a left portion of the retainer 725 is located within an extension housing 16, and a driving gear 213 is defined on an outer surface of the left portion of the retainer 725. The driving gear 213 engages with a driven gear 214 which is located within the extension housing 16, and the driven gear 214 is connected to a speed meter.

The second output shaft 722 is similar to the output shaft 22 of the first embodiment, but a right end of the second output shaft 722 does not have any bevel gear, and a left end of the second output shaft 722 extends to the left. The left end of the second output shaft 722 has a plurality of outer splines which engage securely with a plurality of inner splines of the second intermediate shaft 880.

It is apparent to those skilled in the art that instead of the drive sprocket wheel 23 an input gear may be rotatably mounted on the first output shaft 721, and instead of the driven sprocket wheel 24 an output gear may be rotatably mounted on the second output shaft 722, such that the input gear is engaged directly with the output gear.

As described herein, the present invention overcomes the shortcomings and drawbacks of known systems by providing a transfer gear shift mechanism which can shift a high-low speed shift mechanism from a high speed driving condition to a low speed driving condition without a large amount of friction and without disengagement of engagement sleeves.

While the present invention has been described in its preferred embodiments, it is to be understood that the invention is not limited thereto, and may be otherwise embodied within the scope of the following claims.

What is claimed is:

1. A four-wheel drive system for use in a vehicle including first and second pairs of road wheels, an engine including an output shaft, and a transmission including input and output shafts, the input shaft of the transmission being selectively connected to the output shaft of the engine, the output shaft of the transmission selectively being in driving engagement with the input shaft of the transmission, the four-wheel drive system comprising:

a first spline member being rotatable about a first rotational axis, said first spline member beng driven by the output shaft of the transmission, said first spline member having a first engagement means and a first part of a disengagement preventing means;

a second spline member being rotatable about the first rotational axis of said first spline member, said second spline member being located next to said first spline member, said second spline member having a second engagement means;

an engagement sleeve member being sildably mounted on said second spline member, said engagement sleeve member having a third engagement means and a second part of the disengagement preventing means, the third engagement means of said engagement sleeve member engaging with the second engagement means of said second spline member, the third engagement means of said engagement sleeve member selectively engaging with the first engagement means of said first spline member, the second part of the disengagement preventing means of said engagement sleeve member selectively engaging with the first part of the disengagement preventing means of said first spline member, said engagement sleeve member being selectively positioned at one of a first spline engagement position and a first spline disengagement position;

a shaft membr being located parallel to the first rotational axis of said first spline member, said shaft member being selectively positioned at one of a first position and a second position, the first position of said shaft member corresponding to the first spline engagement position of said engagement sleeve member, the second position of said shaft member corresponding to the first spline disengagement position of said engagement sleeve member, said shaft member having a first notch and a second notch, a width of the first notch being larger than a width of the second notch;

a locking member being biased toward said shaft member, said locking member being selectively inserted in one of the first and second notches of said shaft member, so that when the shaft member is positioned at the first position the locking member is inserted in the first notch of said shaft member and a space is defined in the longitudinal direction of said shaft member between a side of the locking member and a corresponding side of the first notch, and when the shaft member is positioned at the second position the locking member is inserted in the second notch of said shaft member and two sides of the locking member are in contact with corresponding sides of the second notch; and a fork member being secured to said shaft member, said fork member having an engagement finger, the engagement finger engaging with said engagement sleeve member, the fork member being selectively positioned according to one of the first and second positions of said shaft member, whereby when the shaft member is positioned at the first position the locking member is inserted in the first notch of said shaft member with the space, the engagement sleeve member is positioned at the first spline engagement position and the first part of the disengagement preventing means of the first spline member engages with the second part of the disengagement preventing means of the engagement sleeve member, so that even when a torque is applied to the first spline member and a thrust force is exerted on the engagement sleeve member, the engagement sleeve member, the fork member and the shaft member are displaced within the space defined between the locking member and the first notch of the shaft member without a large amount of friction and without disengagement of the engagement sleeve member.

2. The four-wheel drive system of claim 1, wherein said first part of said disengagment preventing means comprises a first pair of chamfers and a first pair of tapered surfaces on an end portion of said first spline member adjacent said engagement sleeve member, and said second part of said disengagement preventing means comprises a second pair of chamfers and a second pair of tapered surfaces on an end portion of said engagement sleeve member adjacent said first spline member.

3. The four-wheel drive system of claim 2, wherein said first and second paris of chamfers face one another, said first pair of tapered surfaces converge in a direction from said first pair of chamfers away from said second pair of chamfers, and said second pair of tapered surfaces converge in a direction from said second pair of chamfers away from said first pair of chamfers.

4. The four-wheel drive system of claim 3, wherein each of said first pair of tapered surfaces tapers at a first angle with respect to the first rotation axis, and each of said second pair of tapered surfaces tapers at a second angle with respect to the first rotational axis, the first and second angles being different from one another.

5. The four-wheel drive system of claim 2, wherein said engagement sleeve member further comprises a groove, the engagement finger of said fork member engaging with the groove of the engagement sleeve member.

6. The four-wheel drive system of claim 5, wherein said shaft member further comprises a third notch, a width of the third notch being substantially equal to the width of the first notch of said shaft member.

7. The four-wheel drive system of claim 6, further comprising an interlock means, the interlock means being selectively inserted in the third notch of said shaft member, a width of the interlock means being smaller than a width of the third notch, whereby when the interlock means is inserted in the third notch a second space is defined in the longitudinal direction of said shaft member between a side of the third notch and a corresponding side of the interlock means.

8. The four-wheel drive system of claim 2, further comprising:
a sprocket member being rotatably mounted on a round portion of the second spline member and being rotatable about the first rotational axis of said first spline member, said sprocket member having a fourth engagement means and a first part of a second disengagement preventing means;
a second engagement sleeve member being slidably mounted on said second spline member, said second engagement sleeve member having a fifth engagement means and a second part of a second disengagement preventing means, the fifth engagement means of said second engagement sleeve member engaging with the second engagement means of said second spline member, the fifth engagement means of said second engagement sleeve member selectively engaging with the fourth engagement means of said sprocket member, the second part of the second disengagement preventing means of said second engagement sleeve member selectively engaging with the first part of the second disengagement preventing means of the sprocket member, said second engagement sleeve member being selectively positioned at one of a sprocket member engagement position and a sprocket member disengagement position;
a second shaft member being located parallel to the first rotational axis of said first spline member, said second shaft member being selectively positioned at one of a third position and a fourth position, the third position of said second shaft member corresponding to the sprocket member engagement position of said second engagement sleeve member, the fourth position of said second shaft member corresponding to the sprocket disengagement position of said second engagement sleeve member, said second shaft member having a third notch and a fourth notch, a width of the third notch being larger than a width of the fourth notch;
a second locking member being biased toward said second shaft member, said second locking member being selectively inserted in one of the third and fourth notches of said second shaft member, so that when the second shaft member is positioned at the third position the second locking member is inserted in the third notch of said second shaft member and a third space is defined in the longitudinal direction of said second shaft member between a side of the second locking member and a corresponding side of the third notch, and when the second shaft member is positioned at the fourth position the second locking member is inserted in the fourth notch of said second shaft member and two sides of the second locking member are in contact with corresponding sides of the fourth notch; and
a second fork member being mounted on said second shaft member, said second fork member having a second engagement finger, the second engagement finger engaging with said second engagement sleeve member, the second fork member being selectively positioned at one of the third and fourth positions of said second shaft member, whereby when the second shaft member is positioned at the third position the second locking member is inserted in the third notch of said second shaft member with the third space, the second engagement sleeve member is positioned at the engagement position and the first part of the second disengagement preventing means of the sprocket member engages with the second part of the second disengagement preventing means of the second engagement sleeve member, so that even when a torque is applied to the second engagement sleeve member through the second spline member and a thrust force is exerted on the second engagement sleeve member, the second engagement sleeve member, the second fork member and the second shaft member are displaced within the third space defined between the second locking member and the third notch of the second shaft member without a large amount of friction and without disengagement of the second engagement sleeve member.

9. The four-wheel drive system of claim 8, wherein said first part of said second disengagement preventing means comprises a third pair of chamfers and third pair of tapered surfaces on an end portion of said sprocket member adjacent said second engagement sleeve member, and said second part of said second disengagement preventing means comprises a fourth pair of chamfers and a fourth pair of tapered surfaces on an end portion of said second engagement sleeve member adjacent said sprocket.

10. The four-wheel drive system of claim 9, wherein said third and fourth paris of chamfers face one another, said third pair of tapered surfaces converge in a direction from said third pair of chamfers away from said fourth pair of chamfers, and said fourth pair of tapered surfaces converge in a direction from said fourth pair of chamfers away from said third pair of chamfers.

11. The four-wheel drive system of claim 10, wherein each of said third pair of tapered surfaces tapers at a third angle with respect to the first rotational axis, and each of said second pair of tapered surfaces tapers at a forth angle with respect to the first rotational axis, the third and fourth angles being different from one another.

12. The four-wheel drive system of claim 9, wherein said second engagement sleeve member further comprises a second groove, the second engagement finger of said second fork member engaging with the second groove of the second engagement sleeve member.

13. The four-wheel drive system of claim 12, wherein said second shaft member further comprises a sixth notch, a width of the sixth notch being substantially equal to the width of the fourth notch of said second shaft member.

14. The four-wheel drive system of claim 13, further comprising an interlock means, the interlock means being selectively inserted in the sixth notch of said second shaft member, a width of the intrlock means being smaller than a width of the sixth notch, whereby when the interlock means is inserted in the sixth notch a fourth space is defined in the longitudinal direction of said second shaft member between a side of the sixth notch and a corresponding side of the interlock means.

15. A four-wheel drive system for use in a vehicle including first and second pairs of road wheels, an engine including an output shaft, and a transmission including input and output shafts, the input shaft of the transmission being selectively connected to the output shaft of the engine, the output shaft of the transmission selectively being in driving engagement with the input shaft of the transmission, the four-wheel drive system comprising:

a first spline member being rotatable about a first rotational axis, said first spline member being driven by the output shaft of the transmission, said first spline member having a first engagement means and a first part of a first disengagement preventing means;

a second spline member being rotatable about the first rotational axis of said first spline member, said second spline member being located next to said first spline member, said second spline member having a second engagement means;

a first engagement sleeve member being slidably mounted on said second spline member, said first engagement sleeve member having a third engagement means and a second part of the first disengagement preventing means, the third engagement means of said first engagement sleeve member engaging with the second engagement means of said second spline member, the third engagement means of said first engagement sleeve member selectively engaging with the first engagement means of said first spline member, the second part of the first disengagement preventing means of said first engagement sleeve member selectively engaging with the first part of the first disengagement preventing means of said first spline member, said first engagement sleeve member being selectively positioned at one of a first spline member engagement position and a first spline member disengagement position;

a first shaft member being located parallel to the first rotational axis of said first spline member, said first shaft member being selectively positioned at one of a first position and a second position, the first position of said first shaft member corresponding to the first spline member engagement position of said first engagement sleeve member, the second position of said first shaft member corresponding to the first spline member disengagement position of said first engagement sleeve member, said first shaft member having a first notch and a second notch, a width of the first notch being larger than a width of the second notch;

a first locking member being biased toward said first shaft member, said first locking member being selectively inserted in one of the first and second notches of said first shaft member, so that when the first shaft member is positioned at the first position the first locking member is inserted in the first notch of said first shaft member and a first space is defined in the longitudinal direction of said first shaft member between a side of the locking member and a corresponding side of the first notch, and when the first shaft member is positioned at the second position the first locking member is inserted in the second notch of said first shaft member and two sides of the first locking member are in contact with corresponding sides of the second notch;

a first fork member being secured to said first shaft member, said first fork member having a first engagement finger, the first engagement finger engaging with said first engagement sleeve member, the first fork member being selectively positioned according to one of the first and second positions of said first shaft member;

a sprocket member being rotatably mounted on a round portion of second second spline member and being rotatable about the first rotational axis of said first spline member, said sprocket member having a fourth engagement means and a first part of a second disengagement preventing means;

a second engagement sleeve member being slidably mounted on said second spline member, said second engagement sleeve member having a fifth engagement means and a second part of a second disengagement preventing means, the fifth engagement means of said second engagement sleeve member engaging with the second engagement means of said second spline member, the fifth engagement means of said second engagement sleeve member selectively engaging with the fourth engagement means of said sprocket member, the second part of the second disengagement preventing means of said second engagement sleeve member selectively engaging with the first part of the second disengagement preventing means of the sprocket member, said second engagement sleeve member being selectively positioned at one of a sprocket member engagement position and a sprocket member disengagement position;

a second shaft member being located parallel to the first rotational axis of said first spline member, said second shaft member being selectively positioned at one of a third position and a fourth position, the third position of said second shaft member corresponding to the sprocket member engagement position of said second engagement sleeve member, the fourth position of said second shaft member corresponding to the sprocket member disengagement position of said second engagement sleeve member, said second shaft member having a third notch and a fourth notch, a width of the third notch being larger than a width of the fourth notch;

a second locking member being biased toward said second shaft member, said second locking member being selectively inserted in one of the third and fourth notches of said second shaft member, so that when the second shaft member is positioned at the third position the second locking member is inserted in the third notch of said second shaft member and a second space is defined in the longitudinal direction of said second shaft member between a side of the second locking member and a corresponding side of the third notch, and when the second shaft member is positioned at the fourth position the second locking member is inserted in the fourth notch of said second shaft member and two sides of the second locking member are in contact with corresponding sides of the fourth notch; and a second fork member being mounted on said second shaft member, said second fork member having second engagement finger, the second engagement finger engaging with said second engagement sleeve member, the second fork member being selectively positioned at one of the third and fourth positions of said second shaft member;

whereby when the first shaft member is positioned at the first position the first locking member is inserted in the first notch of said first shaft member with the first space, the first engagement sleeve member is positioned at the first spline engagement position and the first part of the first disengagement preventing means of the first spline member engages with the second part of the first disengagement preventing means of the first engagement sleeve member, so that even when a torque is applied to the first spline member and a thrust force is exerted on the first engagement sleeve member, the first engagement sleeve member, the first fork member and the first shaft member are displaced within the first space defined between the first locking member and the first notch of the first shaft member without a large amount of friction and without disengagement of the first engagement sleeve member; and further whereby when the second shaft member is positioned at the third position the second locking member is inserted in the third notch of said second shaft member with the third space, the second engagement sleeve member is positioned at the sprocket member engagement position and the first part of the second disengagement preventing means of the sprocket member engages with the second part of the second disengagement preventing means of the second engagement sleeve member, so that even when a torque is applied to the second engagement sleeve member through the second spline member and a thrust force is exerted on the second engagement sleeve member, the second engagement sleeve member, the second fork member and the second shaft member are displaced within the third space defined between the second locking member and the third notch of the second shaft member without a large amount of friction and without disengagement of the second engagement member.

16. The four-wheel drive system of claim 15, wherein said first part of said first disengagement preventing means comprises a first pair of chamfers and a first pair of tapered surfaces on an end portion of said first spline member adjacent said first engagement sleeve member, said second part of said first disengagement preventing means comprises a second pair of chamfers and a second pair of tapered surfaces on an end portion of said first engagement sleeve member adjacent said first spline member, said first part of said second disengagement preventing means comprises a third pair of chamfers and a third pair of tapered surfaces on an end portion of said sprocket member adjacent said second engagement sleeve member, and said second part of said second disengagement preventing means comprises a fourth pair of chamfers and a fourth pair of tapered surfaces on an end portion of said second engagement sleeve member adjacent said sprocket member.

17. The four-wheel drive system of claim 16, wherein said first and second pairs of chamfers face one another, said third and fourth pairs of chamfers face one another, said first pair of tapered surfaces converge in a direction from said first pair of chamfers away from said second pair of chamfers, said second pair of tapered surface converge in a direction from said second pair of chamfers away from said first pair of chamfers, said third pair of tapered surfaces converge in a direction from third pair of chamfers away from said fourth pair of chamfers, and said fourth pair of tapered surfaces converge in a direction from said fourth pair of chamfers away from said third pair of chamfers.

18. The four-wheel drive system of claim 17, wherein each of said first pair of tapered surfaces tapers at a first angle with respect to the first rotational axis, each of said second pair of tapered surfaces tapers at a second angle with respect to the first rotational axis, each of said third pair of tapered surfaces tapers at a third angle with respect to the first rotational axis, and each of said fourth pair of tapered surfaces tapers at a fourth angle with respect to the first rotational axis, the first and second angles being different from one another, and the third and fourth angles being different from one another.

19. The four-wheel drive system of claim 16, wherein said first engagement sleeve member further comprises a first groove, the first engagement finger of said first fork member engaging with the first groove of the first engagement sleeve member.

20. The four-wheel drive system of claim 19, wherein said second engagement sleeve member further comprises a second groove, the second engagement finger of said second fork member engaging with the second groove of the second engagement sleeve member.

21. The four-wheel drive system of claim 20, wherein said first shaft member further comprises a fifth notch, a width of the fifth notch being substantially equal to the width of the first notch of said first shaft member.

22. The four-wheel drive system of claim 21, wherein said second shaft member further comprises a sixth notch, a width of the sixth notch being substantially equal to the width of the third notch of said second shaft member.

23. The four-wheel drive system of claim 21, further comprising an interlock means, the interlock means being selectively inserted in one of the fifth notch of said first shaft member and the sixth notch of said second shaft member, a width of the interlock means being smaller than widths of the fifth and sixth notches, whereby when the interlock means is inserted in the fifth or sixth notch a third space is defined in the longitudinal direction of said first and second shaft members between a side of the fifth or sixth notch and a corresponding side of the interlock means.

24. The four-wheel drive system of claim 16, further comprising:
a second sprocket member being rotatable about a second rotational axis, the second rotational axis being parallel to the first rotational axis, said second sprocket member being driven by the sprocket member, said second sprocket member having a sixth engagement means and a first part of a third disengagement preventing means;
a third spline member being rotatable about the second rotational axis of said second sprocket member, said third spline member being located next to said second sprocket member, said third spline member having a seventh engagement means;
a third engagement sleeve member being slidably mounted on said third spline member, said third engagement sleeve member having an eighth engagement means and a second part of the third disengagement preventing means, the eighth engagement means of said third engagement sleeve member engaging with the seventh engagement means of said third spline member, the eighth engagement means of said third engagement sleeve member selectively engaging with the sixth engagement means of said second sprocket member, the second part of the third disengagement preventing means of said third engagement sleeve member selectively engaging with the first part of the third disengagement preventing means of the second sprocket member, said third engagement sleeve member being selectively positioned at one of a second sprocket engagement position and a second sprocket member disengagement position, the third position of said second shaft member corresponding to the second sprocket member engagement position of said third engagement sleeve member, the fourth position of said second shaft member corresponding to the second sprocket member disengagement position of said third engagement sleeve member; and
said second fork member having a third engagement finger, and third engagement finger engaging with said third engagement sleeve member, the second fork member being selectively positioned at one of the third and fourth positions of said second shaft member.

25. The four-wheel drive system of claim 24, wherein said first part of said third disengagement preventing means comprises a fifth pair of chamfers and a fifth pair of tapered surfaces on an end portion of said second sprocket member adjacent said third engagement sleeve member, and said second part of said third disengagement preventing means comprises a sixth pair of chamfers and a sixth pair of tapered surfaces on an end portion of said third engagement sleeve member adjacent said second sprocket member.

26. The four-wheel drive system of claim 25, wherein said fifth and sixth pairs of chamfers face one another, said fifth pair of tapered surfaces converge in a direction from said fifth pair of chamfers away from said sixth pair of chamfers, and said sixth pair of tapered surfaces converge in a direction from said sixth pair of chamfers away from said fifth pair of chamfers.

27. The four-wheel drive system of claim 26, wherein each of said fifth pair of tapered surfaces tapers at a fifth angle with respect to the second rotational axis, and each of said sixth pair of tapered surfaces tapers at a sixth angle with respect to the second rotational axis, the fifth and sixth angles being different from one another.

28. The four-wheel drive system of claim 25, wherein said third engagement sleeve member further comprises a third groove, the third engagement finger of said second fork member engaging with the third groove of the third engagement sleeve member.

29. A four-wheel drive system for use in a vehicle including first and second pairs of road wheels, an engine including an output shaft, and a transmission including input and output shafts, the input shaft of the transmission being selectively connected to the output shaft of the engine, the output shaft of the transmission selectively being in driving engagement with the input shaft of the transmission, the four-wheel drive system comprising:
a first spline member being rotatable about a first rotational axis, said first spline member being driven by the output shaft of the transmission, said first spline member having a first engagement means and a first part of a first disengagement preventing means;
a second spline member being rotatable about the first rotational axis of said first spline member, said second spline member being located next to said first spline member, said second spline member having a second engagement means;
a first engagement sleeve member being slidably mounted on said second spline member, said first engagement sleeve member having a third engagement means and a second part of the first disengagement preventing means, the third engagement means of said first engagement sleeve member engaging with the second engagement means of said second spline member, the third engagement means of said first engagement sleeve member selectively engaging with the first engagement means of said first spline member, the second part of the first disengagement preventing means of said first engagement sleeve member selectively engaging with the first part of the first disengagement preventing means of said first spline member, said first engagement sleeve member being selectively positioned at one of a first spline engagement position and a first spline disengagement position;
a first shaft member being located parallel to the first rotational axis of said first spline member, said first shaft member being selectively positioned at one of a first position and a second position, the first position of said first shaft member corresponding to the first spline member engagement position of said first engagement sleeve member, the second position of said first shaft member corresponding to the first spline member disengagement position of said first engagement sleeve member, said first shaft member having a first notch and a second notch, a width of the first notch being larger than a width of the second notch;

a first locking member being biased toward said first shaft member, said first locking member being selectively inserted in one of the first and second notches of said first shaft member, so that when the first shaft member is positioned at the first position the first locking member is inserted in the first notch of said first shaft member and a first space is defined in the longitudinal direction of said first shaft member between a side of the first locking member and a corresponding side of the first notch, and when the first shaft member is positioned at the second position the first locking member is inserted in the second notch of said first shaft member and two sides of the first locking member are in contact with corresponding sides of the second notch;

a first fork member being secured to said first shaft member, said first fork member having a first engagement finger, the first engagement finger engaging with said first engagement sleeve member, the first fork member being selectively positioned according to one of the first and second positions of said first shaft member;

a first sprocket member being rotatably mounted on a round portion of the second spline member and being rotatable about the first rotational axis of said first spline member, said first sprocket member having a fourth engagement means and a first part of a second disengagement preventing means;

a second engagement sleeve member being slidably mounted on said second spline member, said second engagement sleeve member having a fifth engagement means and a second part of a second disengagement preventing means, the fifth engagement means of said second engagement sleeve member engaging with the second engagement means of said second spline member, the fifth engagement means of said second engagement sleeve member selectively engaging with the fourth engagement means of said first sprocket member, the second part of the second disengagement preventing means of said second engagement sleeve member selectively engaging with the first part of the second disengagement preventing means of the first sprocket member, said second engagement sleeve member being selectively positioned at one of a first sprocket member engagement position and a first sprocket member disengagement position;

a second shaft member being located parallel to the first rotational axis of said first spline member, said second shaft member being selectively positioned at one of a third position and a fourth position, the third position of said second shaft member corresponding to the first sprocket member engagement position of said second engagement sleeve member, the fourth position of said second shaft member corresponding to the first sprocket member disengagement position of said second engagement sleeve member, said second shaft member having a third notch and a fourth notch, a width of the third notch being larger than a width of the fourth notch;

a second locking member being biased toward said second shaft member, said second locking member being selectively inserted in one of the third and fourth notches of said second shaft member, so that when the second shaft member is positioned at the third position the second locking member is inserted in the third notch of said second shaft member and a second space is defined in the longitudinal direction of said second shaft member between a side of the second locking member and a corresponding side of the third notch, and when the second shaft member is positioned at the fourth position the second locking member is inserted in the fourth notch of said second shaft member and two sides of the second locking member are in contact with corresponding sides of the fourth notch;

a second sprocket member being rotatable about a second rotational axis, the second rotational axis being parallel to the first rotational axis, said second sprocket member being driven by the first sprocket member, said second sprocket member having a sixth engagement means and a first part of a third disengagement preventing means;

a third spline member being rotatable about the second rotational axis of said second sprocket member, said third spline member being located next to said second sprocket member, said third spline member having a seventh engagement means;

a third engagement sleeve member being slidably mounted on said third spline member, said third engagement sleeve member having an eighth engagement means and a second part of the third disengagement preventing means, the eighth engagement means of said third engagement sleeve member engaging with the seventh engagement means of said third spline member, the eighth engagement means of said third engagement sleeve member selectively engaging with the sixth engagement means of said second sprocket member, the second part of the third disengagement preventing means of said sleeve engagement sleeve member selectively engaging with the first part of the third disengagement preventing means of the second sprocket member, said third engagement sleeve member being selectively positioned at one of a second sprocket member engagement position and a second sprocket disengagement position, the third position of said second shaft member corresponding to the second sprocket member engagement position of said third engagement sleeve member, the fourth position of said second shaft member corresponding to the second sprocket member disengagement position of said third engagement sleeve member; and a second fork member being mounted on said second shaft member, said second fork member having second and third engagement fingers, the second engagement finger engaging with said second engagement sleeve member, the third engagement finger engaging with said third engagement sleeve member, the second fork member being selectively positioned at one of the third and fourth positions of said second shaft member;

whereby when the first shaft member is positioned at the first position the first locking member is inserted in the first notch of said first shaft member with the first space, the first engagement sleeve member is positioned at the first spline engagement position and the first part of the first disengagement preventing means of the first spline member engages with the second part of the first disengagement preventing means of the first engagement sleeve member, so that even when a torque is applied to the first spline member and a thrust force is exerted on the first engagement sleeve member, the first engagement sleeve member, the first fork member and the first shaft member are displaced within the first space defined between the first locking member and the first notch of the first shaft member without a large amount of friction and without disengagement of the first engagement sleeve member; and further whereby when the second shaft member is positioned at the third position the second locking member is inserted in the third notch of said second shaft member with the third space, the second and third engagement sleeve members are positioned respectively at the first and second sprocket member engagement positions and the first parts of the second and third disengagement preventing means of the first and second sprocket members engage respectively with the second parts of the second and third disengagement preventing means of the second and third engagement sleeve member, so that even when a torque is applied to the second and third engagement sleeve members through the second spline member and a thrust force is exerted on the second and third engagement sleeve member, the second and third engagement sleeve members, the second fork member and the second shaft member are displaced within the third space defined between the second locking member and the third notch of the second shaft member without a large amount of friction and without disengagement of the second and third engagement sleeve members.

30. The four-wheel drive system of claim 29, wherein said first part of said first disengagement preventing means comprises a first pair of chamfers and a first pair of tapered surfaces on an end portion of said first spline member adjacent said first engagement sleeve member, said second part of said first disengagement preventing means comprises a second pair of chamfers and a second pair of tapered surfaces on an end portion of said first engagement sleeve member adjacent said first spline member, said first pair of said second disengagement preventing means comprises a third pair of chamfers and a third pair of tapered surfaces on an end portion of said first sprocket member adjacent said second engagement sleeve member, said second part of said second disengagement preventing means comprises a fourth pair of chamfers and a fourth pair of tapered surfaces on an end portion of said second engagement sleeve member adjacent said first sprocket member, said first part of said third disengagement preventing means comprises a fifth pair of chamfers and a fifth pair of tapered surfaces on an end portion of said second sprocket member adjacent said third engagement sleeve member, and said second part of said third disengagement preventing means comprises a sixth pair of chamfers and a sixth pair of tapered surfaces on an end portion of said third engagement sleeve member adjacent said second sprocket member.

31. The four-wheel drive system of claim 30, wherein said first and second pairs of chamfers face one another, said third and fourth pairs of chamfers face one another, said fifth and sixth pairs of chamfers face one another, said first pair of tapered surfaces converge in a direction from said first pair of chamfers away from said second pair of chamfers, said second pair of tapered surfaces converge in a direction from said second pair of chamfers away from said first pair of chamfers, said third pair of tapered surfaces converge in a direction from said third pair of chamfers away from said fourth pair of chamfers, said fourth pair of tapered surfaces converge in a direction from said fourth pair of chamfers away from said third pair of chamfers, said fifth pair of tapered surfaces converge in a direction from said fifth pair of chamfers away from said sixth pair of chamfers, and said sixth pair of tapered surfaces converge in a direction from said sixth pair of chamfers away from said fifth pair of chamfers.

32. The four-wheel drive system of claim 31, wherein each of said first pair of tapered surfaces tapers at a first angle with respect to the first rotational axis, each of said second pair of tapered surfaces tapers at a second angle with respect to the first rotational axis, each of said third pair of tapered surfaces tapers at a third angle with respect to the first rotational axis, each of said fourth pair of tapered surfaces tapers at a fourth angle with respect to the first rotational axis, each of said fifth pair of tapered surfaces tapers at a fifth angle with respect to the second rotational axis, and each of said sixth pair of tapered surfaces tapers at a sixth angle with respect to the second rotational axis, the first and second angles being different from one another, the third and fourth angles being different from one another, and the fifth and sixth angles being different from one another.

33. The four-wheel drive system of claim 30, wherein said first shaft member further comprises a fifth notch, a width of the fifth notch being substantially equal to the width of the first notch of said first shaft member.

34. The four-wheel drive system of claim 33, wherein said second shaft member further comprises a sixth notch, a width of the sixth notch being substantially equal to the width of the third notch of said second shaft member.

35. A four-wheel drive system of claim 34, further comprising an interlock means, the interlock means being selectively inserted in one of the fifth notch of said first shaft member and the sixth notch of said second shaft member, a width of the interlock means being smaller than widths of the fifth and sixth notches, whereby when the interlock means is inserted in the fifth or sixth notch a third space is defined in the longitudinal direction of said first and second shaft members between a side of the fifth or sixth notch and a corresponding side of the the interlock means.

* * * * *